United States Patent
Shinozaki

(10) Patent No.: US 10,235,089 B2
(45) Date of Patent: Mar. 19, 2019

(54) STORAGE CONTROL DEVICE, METHOD AND STORAGE SYSTEM TO BACKUP DATA USING ALLOCATION INFORMATION

(71) Applicant: FUJITSU LIMITED, Kawasaki-shi, Kanagawa (JP)

(72) Inventor: Yoshinari Shinozaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 15/136,192

(22) Filed: Apr. 22, 2016

(65) Prior Publication Data

US 2016/0320977 A1    Nov. 3, 2016

(30) Foreign Application Priority Data

May 1, 2015   (JP) ................................ 2015-093981

(51) Int. Cl.
*G06F 3/06*    (2006.01)
*G06F 11/14*   (2006.01)

(52) U.S. Cl.
CPC ............ *G06F 3/065* (2013.01); *G06F 3/0617* (2013.01); *G06F 3/0689* (2013.01); *G06F 11/1402* (2013.01)

(58) Field of Classification Search
CPC ...... G06F 3/0665; G06F 3/0619; G06F 3/065; G06F 3/0683
See application file for complete search history.

(56) References Cited

U.S. PATENT DOCUMENTS

| 5,742,792 A | * | 4/1998 | Yanai | .................... G06F 3/0601 |
| | | | | 710/1 |
| 6,282,602 B1 | * | 8/2001 | Blumenau | ............... G06F 3/061 |
| | | | | 711/111 |
| 2008/0177809 A1 | | 7/2008 | Murayama et al. | |
| 2009/0216972 A1 | | 8/2009 | Deguchi et al. | |

(Continued)

FOREIGN PATENT DOCUMENTS

| JP | 2007-199922 A | 8/2007 |
| JP | 2008-181271 A | 8/2008 |

(Continued)

OTHER PUBLICATIONS

Japanese Office Action dated Nov. 6, 2018 in corresponding Japanese Patent Application No. 2015-093981 (4 pages) (3 pages English Translation).

*Primary Examiner* — Larry T Mackall
(74) *Attorney, Agent, or Firm* — Staas & Halsey LLP

(57) ABSTRACT

A backup source volume is a virtual volume, a plurality of regions of the backup source volume is allocatable to the storage device. A storage control device is configured to set a backup destination volume, the backup destination volume includes a plurality of regions, store allocation information which indicates a first region of the plurality of regions of the backup source volume is allocated to the storage device and indicates a second region of the plurality of regions of the backup source volume is not allocated to the storage device, the first region and the second region corresponding to a third region and a fourth region included in the plurality of regions of the backup destination volume respectively, set the forth region free from the first data stored in the at least one storage device, and copy second data stored in the first region to the third region.

9 Claims, 26 Drawing Sheets

(56) References Cited

U.S. PATENT DOCUMENTS

| | | | | |
|---|---|---|---|---|
| 2009/0276588 A1* | 11/2009 | Murase | ................ | G06F 3/0608 |
| | | | | 711/160 |
| 2010/0082715 A1* | 4/2010 | Dohm | ................... | G06F 3/0608 |
| | | | | 707/822 |
| 2010/0250880 A1 | 9/2010 | Mimatsu | | |
| 2010/0299491 A1 | 11/2010 | Ueda | | |
| 2011/0022811 A1 | 1/2011 | Kirihata et al. | | |
| 2013/0185264 A1* | 7/2013 | Cohen | .............. | G06F 17/30135 |
| | | | | 707/656 |

FOREIGN PATENT DOCUMENTS

| | | |
|---|---|---|
| JP | 2009-205415 A | 9/2009 |
| JP | 2010-086474 A | 4/2010 |
| JP | 2010-231770 A | 10/2010 |
| JP | 2010-271808 A | 12/2010 |
| JP | 2015-007881 A | 1/2015 |

* cited by examiner

FIG. 10

| DATA ITEM NAME | VALUE |
|---|---|
| SESSION ID | 1 |
| STATE | NORMAL |
| PHASE | COPYING |
| COPY SOURCE IDENTIFICATION INFORMATION | LUN#1 |
| COPY SOURCE INITIATION ADDRESS | 0x... |
| COPY DESTINATION IDENTIFICATION INFORMATION | LUN#2 |
| COPY DESTINATION INITIATION ADDRESS | 0x... |
| COPY SIZE | 1000 |
| ⋮ | ⋮ |
| MODE | BACKUP |
| BITMAP MANAGEMENT INFORMATION POINTER (Top) | 0x... |
| BITMAP MANAGEMENT INFORMATION POINTER (Btm) | 0x... |
| ⋮ | ⋮ |
| SESSION MANAGEMENT INFORMATION POINTER (Next) | 0x... |
| SESSION MANAGEMENT INFORMATION POINTER (Prev) | 0x... |
| ⋮ | ⋮ |

| DATA ITEM NAME | VALUE |
|---|---|
| BITMAP CLASSIFICATION | BACKUP |
| BITMAP MANAGEMENT INFORMATION POINTER (Next) | 0x... |
| BITMAP MANAGEMENT INFORMATION POINTER (Prev) | 0x... |
| COPY BITMAP ADDRESS | 0x... |

FIG. 14

| DATA ITEM NAME | VALUE |
|---|---|
| STATE | NORMAL |
| VOLUME TYPE | VIRTUAL VOLUME |
| COPY SOURCE SESSION (Top) | 0x... |
| COPY SOURCE SESSION (Btm) | 0x... |
| COPY DESTINATION SESSION (Top) | 0x... |
| COPY DESTINATION SESSION (Btm) | 0x... |
| POINTER TO ALLOCATION INFORMATION MANAGEMENT INFORMATION (Top) | 0x... |
| POINTER TO ALLOCATION INFORMATION MANAGEMENT INFORMATION (Btm) | 0x... |

FIG. 17

| DATA ITEM NAME | VALUE |
| --- | --- |
| IDENTIFICATION INFORMATION OF SESSION MANAGEMENT INFORMATION | 0x... |
| POINTER TO ALLOCATION INFORMATION MANAGEMENT INFORMATION (Next) | 0x... |
| POINTER TO ALLOCATION INFORMATION MANAGEMENT INFORMATION (Prv)t) | 0x... |
| ADDRESS OF ALLOCATION INFORMATION | 0x... |

STORAGE CONTROL DEVICE, METHOD AND STORAGE SYSTEM TO BACKUP DATA USING ALLOCATION INFORMATION

CROSS-REFERENCE TO RELATED APPLICATION

This application is based upon and claims the benefit of priority of the prior Japanese Patent Application No. 2015-093981, filed on May 1, 2015, the entire contents of which are incorporated herein by reference.

FIELD

The embodiment discussed herein is related to a storage control device, a method and a storage system.

BACKGROUND

An advanced copy function is known as an example of a function of a storage device. An advanced copy function is a function that implements the backup of data of a work volume with firmware of a storage device without using the resources of a server (a host). One point copy (OPC) function and Quick OPC function are known as examples of the advanced copy functions. The OPC reproduces all of the data of a work volume in snapshot form at a predetermined timing. Like the OPC, the Quick OPC creates a reproduction of all of the data of a work volume at an initial backup, and copies updated portions (different portions) at a second backup and onwards.

There are cases where a work volume, which corresponds to a backup source, and a backup volume, which corresponds to a backup destination, are managed as virtual volumes. A virtual volume is a virtual logical volume. A portion of regions of a physical resource are dynamically allocated from a storage pool to a virtual volume depending on access from a server. Thin provisioning is known as an example of a function that allocates effective physical regions to such a virtual volume.

In thin provisioning, a virtual volume can make a server recognize a virtual storage capacity, which differs from a storage capacity of a physical region that is effectively allocated. Further, a storage resource that is effectively allocated to a virtual volume can also be set to a requisite minimum. A physical region of a virtual volume is dynamically allocated when data from a server is written to the virtual volume. The unit of the allocation of physical regions is a segment of one or more disk drives within a storage system, or the like. Meanwhile, in a case where an unnecessary region arises in a virtual volume as a result of data being deleted, or the like, the allocation of the physical region thereof is removed. The removal of the allocation of such a physical region is, for example, performed by issuing an execute instruction of an UNMAP command or formatting of a volume.

With respect to the backup of data, various items of the related art are known.

For example, with respect to a certain item of the related art, an information backup/restoration process device configures a device driver that performs filtering of an I/O of a virtualized volume, which corresponds to a backup destination on a host device side. Further, the information backup/restoration process device cooperates with a mounted file system, and performs a process so that only a portion of a sector region that is being used as a file is READ and WRITTEN. As a result of this, the information backup/restoration process device realizes the READING and WRITING of only a portion desired for backup on the virtual volume.

In another technique, a storage control device refers to writing management information, which is information for managing where on one or more related first storage devices writing of a plurality of segments has occurred. As a result of this, the storage control device specifies one or more locations in the one or more first storage devices at which writing has occurred, and performs backup of one or more data elements in the second storage device, which are respectively stored in the specified one or more locations.

In still another technique, in addition to a storage system control module, a management server and a backup server, a storage system includes one or more virtual volumes and a virtual file system. Each virtual volume is represented as a virtual file within the virtual file system. In this instance, each virtual file represents data that is effectively saved within a virtual volume. The storage system control module is configured in a manner that facilitates a backup operation of a selected virtual volume. The operation includes a step of accessing the virtual file system of the storage system, and a step of reading a virtual file that corresponds to a selected virtual volume. The storage system control module is configured in a manner that facilitates a restoration operation of a selected virtual volume. The operation includes a step of accessing the virtual file system of the storage system, and a step of creating a virtual file that represents a selected virtual volume.

Japanese Laid-open Patent Publication No. 2010-86474, Japanese Laid-open Patent Publication No. 2008-181271, and Japanese Laid-open Patent Publication No. 2010-231770 are examples of the related art.

SUMMARY

According to an aspect of the invention, a storage control device configured to control at least one storage device to execute a backup process from a backup source volume using the at least one storage device to a backup destination volume using the at least one storage device, the backup source volume being a virtual volume and including a plurality of regions, the plurality of regions of the backup source volume being allocatable to the at least one storage device, the storage control device including a memory, and a processor coupled to the memory and configured to set the backup destination volume in the at least one storage device which stores first data, the backup destination volume including a plurality of regions corresponding to the plurality of regions of the backup source volume respectively, store allocation information which indicates a first region included in the plurality of regions of the backup source volume is allocated to the at least one storage device and indicates a second region included in the plurality of regions of the backup source volume is not allocated to the at least one storage device, the first region and the second region corresponding to a third region and a fourth region included in the plurality of regions of the backup destination volume respectively, based on the allocation information, set the forth region free from the first data stored in the at least one storage device, and based on the allocation information, copy second data stored in the first region to the third region.

The object and advantages of the invention will be realized and attained by means of the elements and combinations particularly pointed out in the claims.

BRIEF DESCRIPTION OF DRAWINGS

FIG. 10 illustrates an example of a configuration of session management information;

FIG. 12 is a diagram for describing copy bitmap management information;

FIG. 14 illustrates an example of a configuration of volume management information;

FIG. 17 illustrates an example of a configuration of allocation information management information;

DESCRIPTION OF EMBODIMENT

Formats in which are a commonly-used by a plurality of users with different conditions of use, and system formats such as cloud are increasing. In these formats, application that corresponds to any management formats with different storage resources is performed in a storage device. Among management formats of resources, there are formats that manage as a virtual volume, and formats that manage as a physical volume. At this time, a storage device prepares backup volumes that correspond to respective formats by matching a management format of a work volume. This is wasteful in terms of both cost and application. In the above-mentioned items of the related art, physical allocation of a backup volume is not taken into consideration.

In such an instance, from one point of view, an object of the embodiment is to realize an optimum backup according to a management format of a resource of a backup destination.

It is possible to consider the following four combinations of management formats of a backup source volume (a work volume) and a backup destination volume (a backup volume). That is, there are four combinations of backup to a virtual volume from a virtual volume (pattern A), backup to a physical volume from a virtual volume (pattern B), backup to a virtual volume from a physical volume (pattern C), and backup to a physical volume from a physical volume (pattern D). Hereinafter, the respective patterns will be described with reference to FIGS. 1 to 4.

Figure 1:
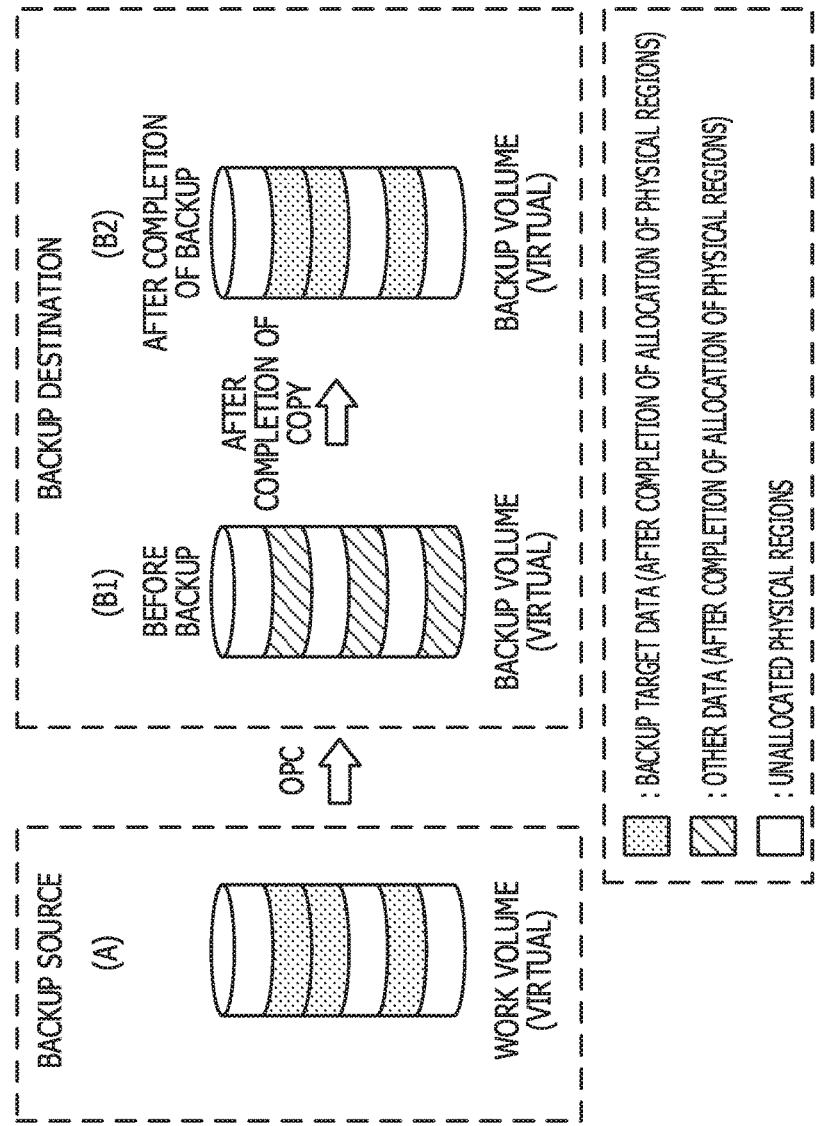
FIG. 1 is a diagram for describing backup to a virtual volume from a virtual volume.

FIG. 1 is a diagram for describing backup to a virtual volume from a virtual volume. As illustrated in FIG. 1, a work volume and a backup volume are virtual volumes. Physical regions are allocated to portions of the work volume and the backup volume. However, the allocated regions differ. Backup target data is stored in physical regions that are allocated to the work volume ((A) in FIG. 1). Other data that is unrelated to backup is stored in physical regions that are allocated to the backup volume ((B1) in FIG. 1). In a case where backup is performed using OPC or the like from this state, it is desirable that the backup volume attains the same physical allocation state as that of the work volume at a point in time at which the backup is initiated. In addition, it is desirable to attain a state in which the same data as that of the work volume at a point in time at which the backup is initiated, is stored in the physical regions allocated to the backup volume ((B2) in FIG. 1).

Figure 2:
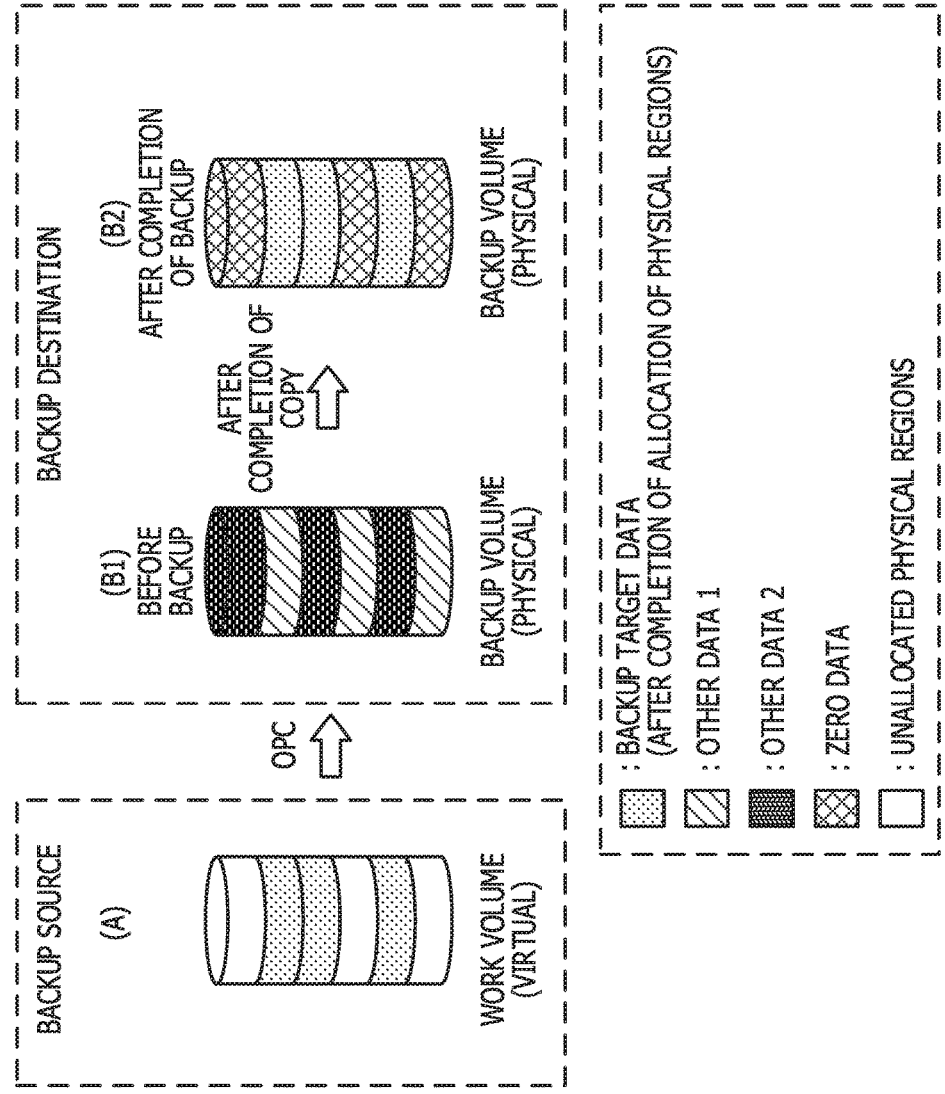
FIG. 2 is a diagram for describing backup to a physical volume from a virtual volume.

FIG. 2 is a diagram for describing backup to a physical volume from a virtual volume. As illustrated in FIG. 2, a work volume is a virtual volume, and a backup volume is a physical volume. Physical regions are allocated to portions of the work volume. Backup target data is stored in physical regions that are allocated to the work volume ((A) in FIG. 2). Since the backup volume is a physical volume, allocation does not have to be considered. Other data 1 and other data 2 that is unrelated to backup is stored in the backup volume ((B1) in FIG. 2). In a case where backup is performed using OPC or the like from this state, it is desirable to attain a state in which the backup target data and zero data (dummy data) are eventually stored in the backup volume. Moreover, among the regions of the backup volume, it is desirable that the backup target data is stored in regions that correspond to physical regions that are allocated to the work volume during initiation of the backup. In addition, among the regions of the backup volume, it is desirable that the zero data is stored in regions that correspond to unallocated regions in the work volume during initiation of the backup ((B2) in FIG. 2).

Figure 3:
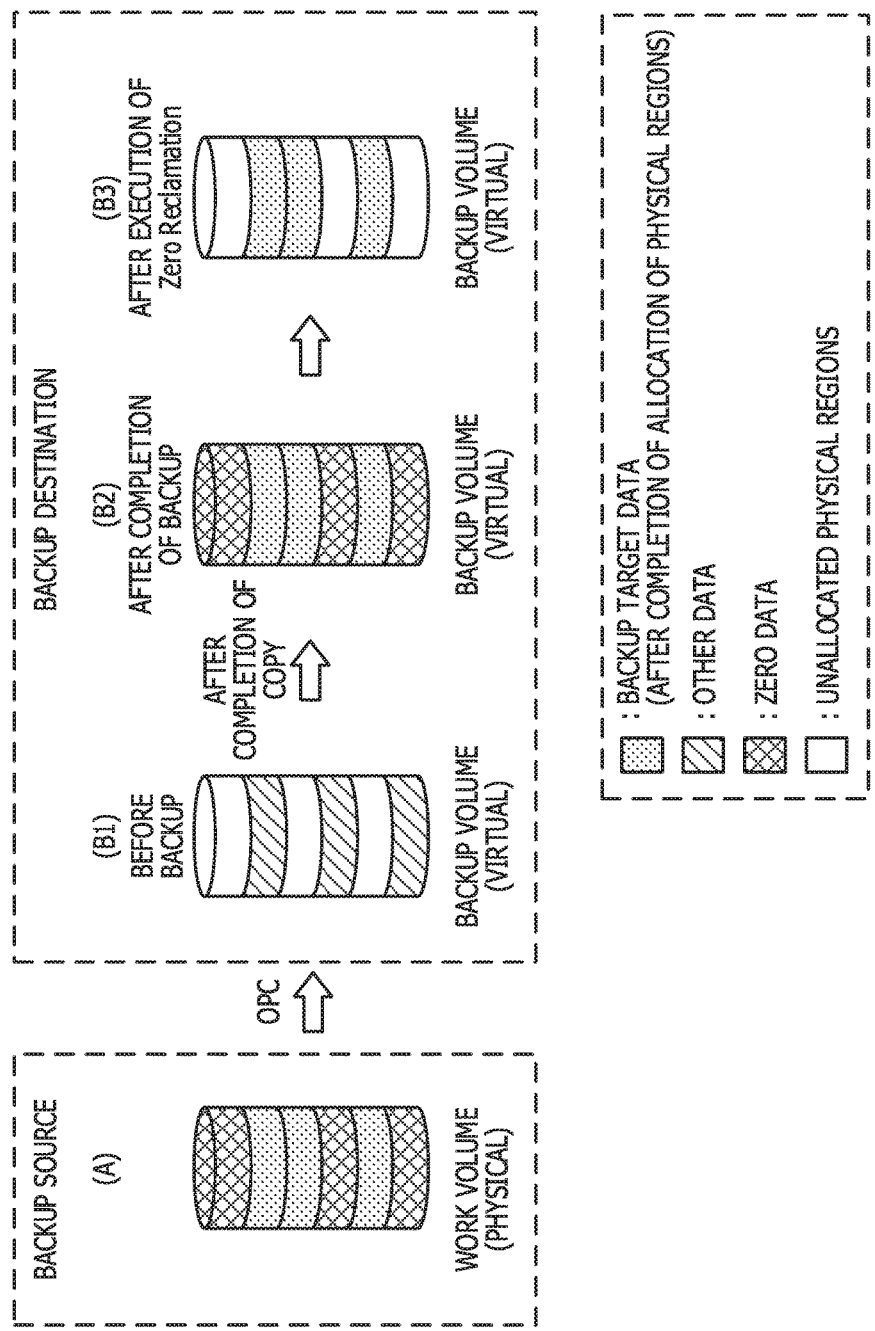
FIG. 3 is a diagram for describing backup to a virtual volume from a physical volume.

FIG. 3 is a diagram for describing backup to a virtual volume from a physical volume. As illustrated in FIG. 3, a work volume is a physical volume, and a backup volume is a virtual volume. Backup target data and zero data are stored in physical regions of the work volume ((A) in FIG. 3). Physical regions are allocated to portions of the backup volume before backup, and other data that is unrelated to backup is stored in these physical regions ((B1) in FIG. 3). In a case where backup is performed using OPC or the like from this state, physical regions are allocated to the entire virtual volume using a thin provisioning function, and a state in which copy of the entire physical volume is performed is attained ((B2) in FIG. 3).

However, it is not said that the state that is illustrated by (B2) in FIG. 3 is a desirable state. The reason for this is that the advantages of a virtual volume are lost in a state in which physical regions are allocated to the entire backup volume. In such an instance, a Zero Reclamation function is used as a method for preserving the advantages of a virtual volume in the backup volume. A Zero Reclamation function is a function that independently performs checking of whether or not user data is zero data using firmware, and sets the user data to an unallocated state by removing the physical allocation of the corresponding regions in a case where the user data is zero data. As a result of this, the physical regions of zero data portions are released, and a state of an expected backup volume is realized.

By using this kind of Zero Reclamation function, the backup volume eventually attains a state in which the physical regions of zero data portions are released ((B3) in FIG. 3). In this manner, if a Zero Reclamation function is used, the advantages of a virtual volume are preserved. However, a process of performing a copy process of zero data sections as a result of backup, and thereafter releasing the portions as a result of a Zero Reclamation function is wasteful. In addition, with respect to the use of a Zero Reclamation function, the process load in order to read all of the data of a target volume in a practical sense, and check whether or not the data is zero data, is high.

Figure 4:
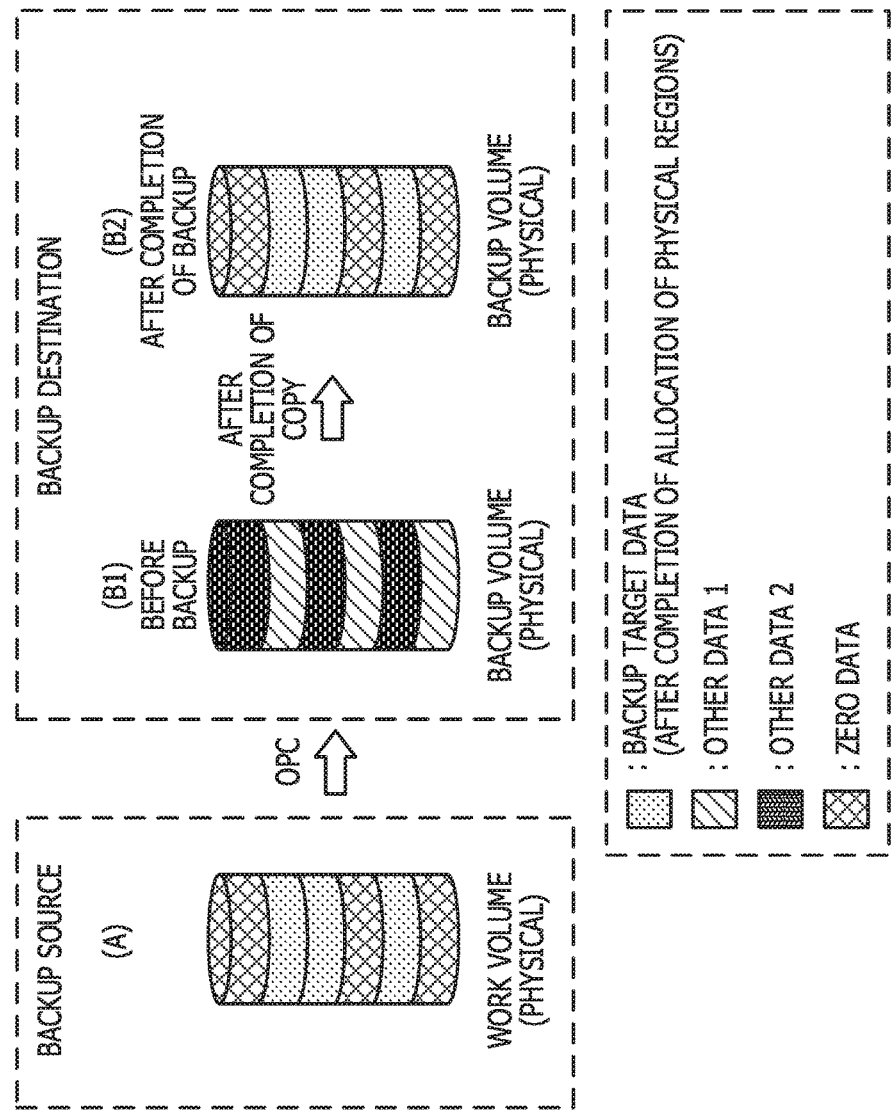
FIG. 4 is a diagram for describing backup to a physical volume from a physical volume.

FIG. 4 is a diagram for describing backup to a physical volume from a physical volume. As illustrated in FIG. 4, a work volume and a backup volume are both physical volumes. Backup target data and zero data are stored in physical regions of the work volume ((A) in FIG. 4). Other data 1 and other data 2 that is unrelated to backup is stored in the backup volume before backup ((B1) in FIG. 4). In a case where backup is performed using OPC or the like from this state, the copy of the entire physical volume is performed, a state in which the backup volume is the same as the work volume is eventually attained ((B2) in FIG. 4). There is no allocation process in backup to a physical volume from a physical volume.

Backup is performed using either an OPC or a Quick OPC function, but in a case of returning backed-up data (restoring) also, either an OPC or a Quick OPC function is used in the same manner. Restoration is equivalent to an action of a reverse backup being performed. That is, restoration is classified into four patterns that correspond to the above-mentioned four backup patterns.

The restoration of pattern A corresponds to a reverse backup between virtual volumes. Apart from the backup source and the backup destination being interchanged, the restoration of pattern A is the same as the backup of pattern A. In the same manner as that during backup acquisition, it is desirable that the state of the virtual volume of a restoration destination (the backup source) becomes the same as that of the restoration source (the backup destination) with respect to the allocation state of physical regions and the data that is stored in the physical regions. That is, it is desirable to attain the state of the original work volume in a case where the work volume is backed up, and the backed-up data is restored.

The restoration of pattern B corresponds to backup to a virtual volume from a physical volume. This is the same as the backup of pattern C. Accordingly, physical regions are allocated in all of the regions in the virtual volume of the restoration destination (the work volume) using a thin provisioning function. Since the advantages of a virtual volume are lost in this state, physical regions in which zero data is stored, are released using a Zero Reclamation function after the completion of restoration, and the advantages of a virtual volume are preserved.

The restoration of pattern C corresponds to backup to a physical volume from a virtual volume. This is the same as the backup of pattern B. Accordingly, the data of physical regions that are allocated to the virtual volume are copied to regions that correspond to the physical volume. Zero data is stored in regions of the physical volume that correspond to unallocated regions in the virtual volume.

The restoration of pattern D corresponds to a reverse backup between physical volumes. Apart from the backup source and the backup destination being interchanged, the restoration of pattern D is the same as the backup of pattern D. Accordingly, the data of a restoration source s merely returned to a restoration destination.

Figure 5:
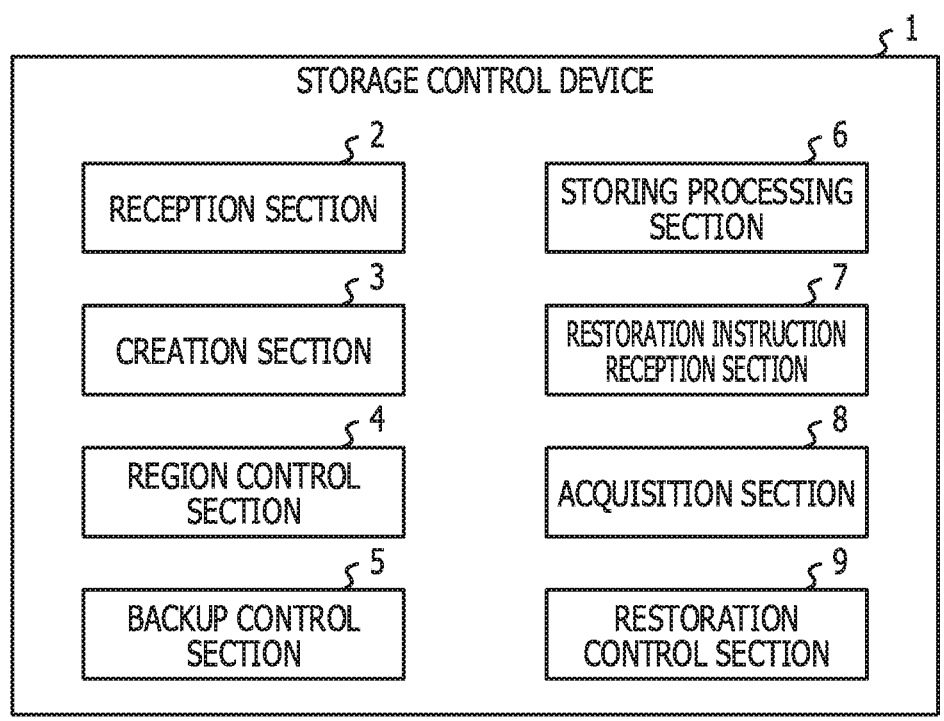
FIG. 5 illustrates an example of functional blocks of a storage control device according to an embodiment.

FIG. 5 illustrates an example of functional blocks of a storage control device according to an embodiment. In FIG. 5, a storage control device 1 includes a reception section 2, a creation section 3, a region control section 4, a backup control section 5, a storing processing section 6, a restoration instruction reception section 7, an acquisition section 8 and a restoration control section 9.

The reception section 2 receives a backup instruction to the backup destination volume from a backup source virtual volume in which storage regions of a storage device are variably allocated depending on a usage status thereof.

The creation section 3 creates allocation information, which indicates an allocation status of storage regions of a backup source virtual volume depending on a backup instruction.

The region control section 4 performs a preprocess, which depends on whether or not the backup destination volume is a virtual volume, on the storage regions of the backup destination volume based on the allocation information.

The backup control section 5 performs control that copies data from the backup source virtual volume to storage regions on which the preprocess was carried out.

The storage control device 1 performs a copy preprocess, which depends on whether or not the backup destination is a virtual volume or a physical volume, on the storage regions of the backup destination volume. As a result of this, an optimum backup according to a management format of a resource of the backup destination is realized.

In addition, in a case where the backup destination volume is a virtual volume, the region control section 4 performs a copy preprocess that changes the allocation of the storage regions of the backup destination volume based on the allocation information. As a result of this, in backup between virtual volumes, a backup destination volume in which the stored data and the physical allocation are in the same state as those of the backup source virtual volume, is created efficiently.

In addition, in a case where the backup destination volume is a physical volume, the region control section 4 performs the following process. That is, the region control section 4 performs a copy preprocess that, among the storage regions of the backup destination volume, stores dummy data in regions that correspond to unallocated regions of the backup source virtual volume to which storage regions have not been allocated. As a result of this, unnecessary data is removed from the backup destination volume, and it is possible to use the backup destination volume as the work volume without change.

In addition, the backup control section 5 copies data from the storage regions that are allocated in the backup source virtual volume to corresponding storage regions that of the backup destination volume. In addition, in a case where the backup destination volume is a physical volume, the backup control section 5 backs up data that is stored in the storage regions of the backup source virtual volume, and does not back up other data. As a result of this, backup to a physical volume from a virtual volume is performed efficiently.

The storing processing section 6 stores the allocation information during backup in association with the backup destination volume. Additionally, the storage section is included in a storage device that is coupled to the storage control device 1 in a communicable manner. Alternatively, the storage section may be included in the storage control device 1.

The restoration instruction reception section 7 receives a restoration instruction to the restoration destination volume from the backup destination volume.

The acquisition section 8 acquires allocation information that corresponds to a backup destination volume that is indicated by the restoration instruction, from the storage section.

The restoration control section 9 specifies restoration target data based on the acquired allocation information, and restores the specified restoration target data to the restoration destination volume. As a result of this, in a case of restoring backup data acquired from a virtual volume, an efficient restoration can be realized by using the allocation information acquired during backup regardless of the state of the volume of the restoration destination.

In addition, in a case where the restoration destination volume is a virtual volume, the region control section 4 changes the allocation of the storage regions of the restoration destination volume based on the acquired allocation information. Further, in a case where the restoration destination volume is a physical volume, among the storage regions of the restoration destination volume, the region control section 4 stores dummy data in storage regions that correspond to unallocated regions of the backup source virtual volume during backup based on the acquired allocation information. Further, the restoration control section 9 restores the restoration target data to the storage regions of the restoration destination volume that correspond to the storage regions of the backup destination volume in which the restoration target data is stored based on the acquired allocation information.

In a case where the restoration destination is a virtual volume, the storage control device 1 changes the physical allocation of the restoration destination based on the allocation information acquired during backup before restoration. As a result of this, in a case of restoring backup data acquired from a virtual volume to a virtual volume, a restoration destination volume in which the stored data and the physical allocation are in the same state as those of the backup source, is created efficiently. In addition, among the storage regions of the restoration destination volume, the storage control device 1 stores dummy data in storage regions that correspond to the storage regions of the restoration source (backup destination) volume in which the restoration target data is not stored. As a result of this, unnecessary data is removed, and it is possible to use the restoration destination volume as the work volume without change. In addition, in a case where the restoration destination volume is a physical volume, the storage control device 1 restores the restoration target data that was specified based on the allocation information acquired during backup, and does not restore other data. As a result of this, backup data that is acquired from a virtual volume is restored to a physical volume efficiently.

Figure 6:
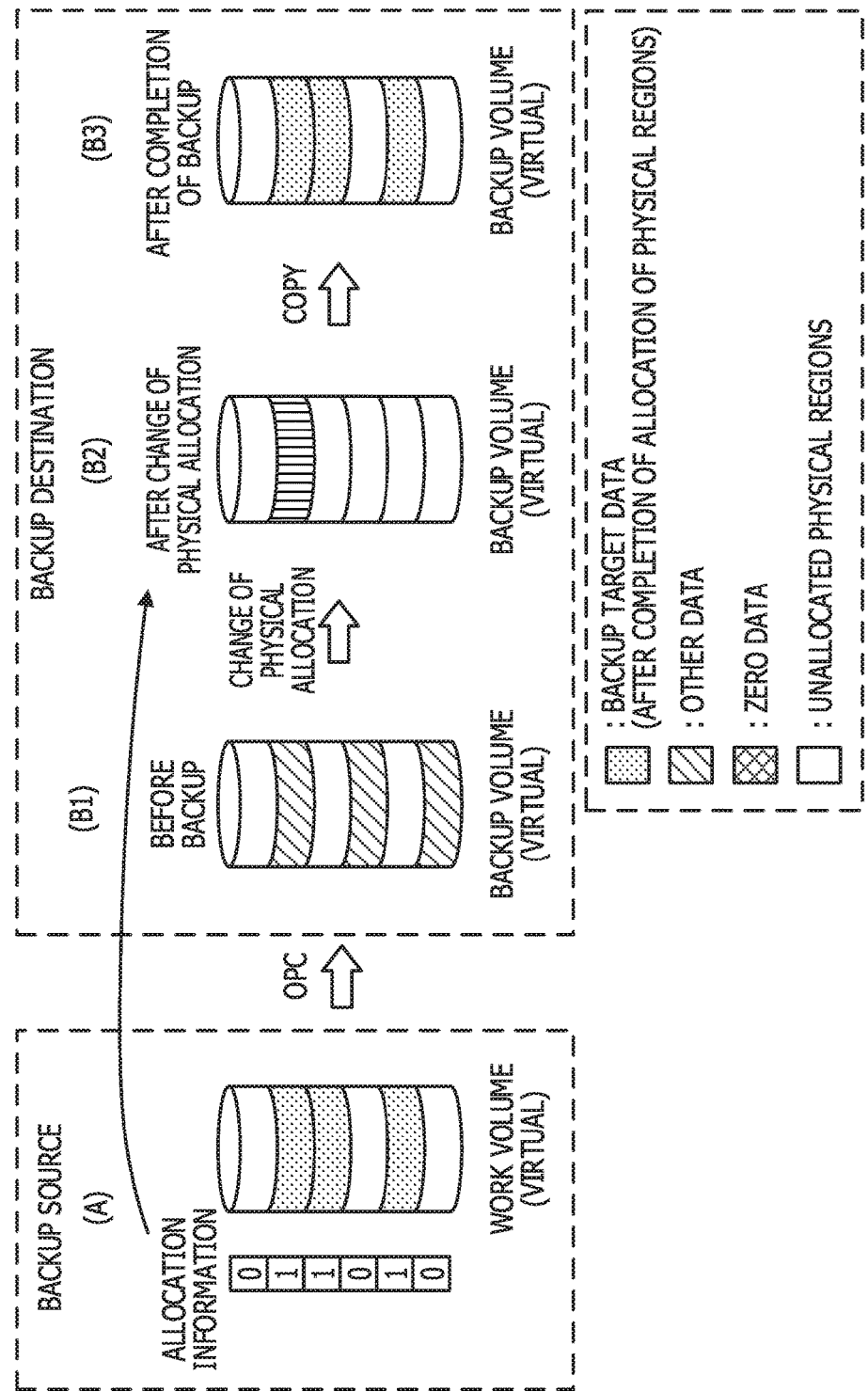
FIG. 6 illustrates an action example of backup to a virtual volume from a virtual volume in the storage control device of the embodiment.

In this instance, an action example of backup to a virtual volume from a virtual volume in the storage control device of the embodiment will be described. FIG. 6 illustrates an action example of backup to a virtual volume from a virtual volume in the storage control device of the embodiment. This action example illustrates a circumstance of backup of the embodiment in pattern A that was described with reference to FIG. 1.

In FIG. 6, during backup, firstly, information that indicates a physical allocation status of a work volume is acquired ((A) in FIG. 6). Next, a physical allocation state of a backup volume is changed based on information that is indicated by the physical allocation status (from (B1) to (B2) in FIG. 6). At this point in time, regions of the backup volume that correspond to unallocated regions of the work volume attain an unallocated state. After this, physical regions that are allocated to the work volume are specified based on information that indicates the physical allocation status, and backup target data is copied to the backup volume from the physical regions ((B3) in FIG. 6). In this manner, in the embodiment, information that indicates the physical allocation status of the work volume before the initiation of backup is acquired, and an efficient backup process is realized by performing backup by applying the information. In addition, the information which indicates the physical allocation status of the work volume, and which is acquired before backup, is saved in a predetermined storage region in association with the backup destination volume.

Figure 7:
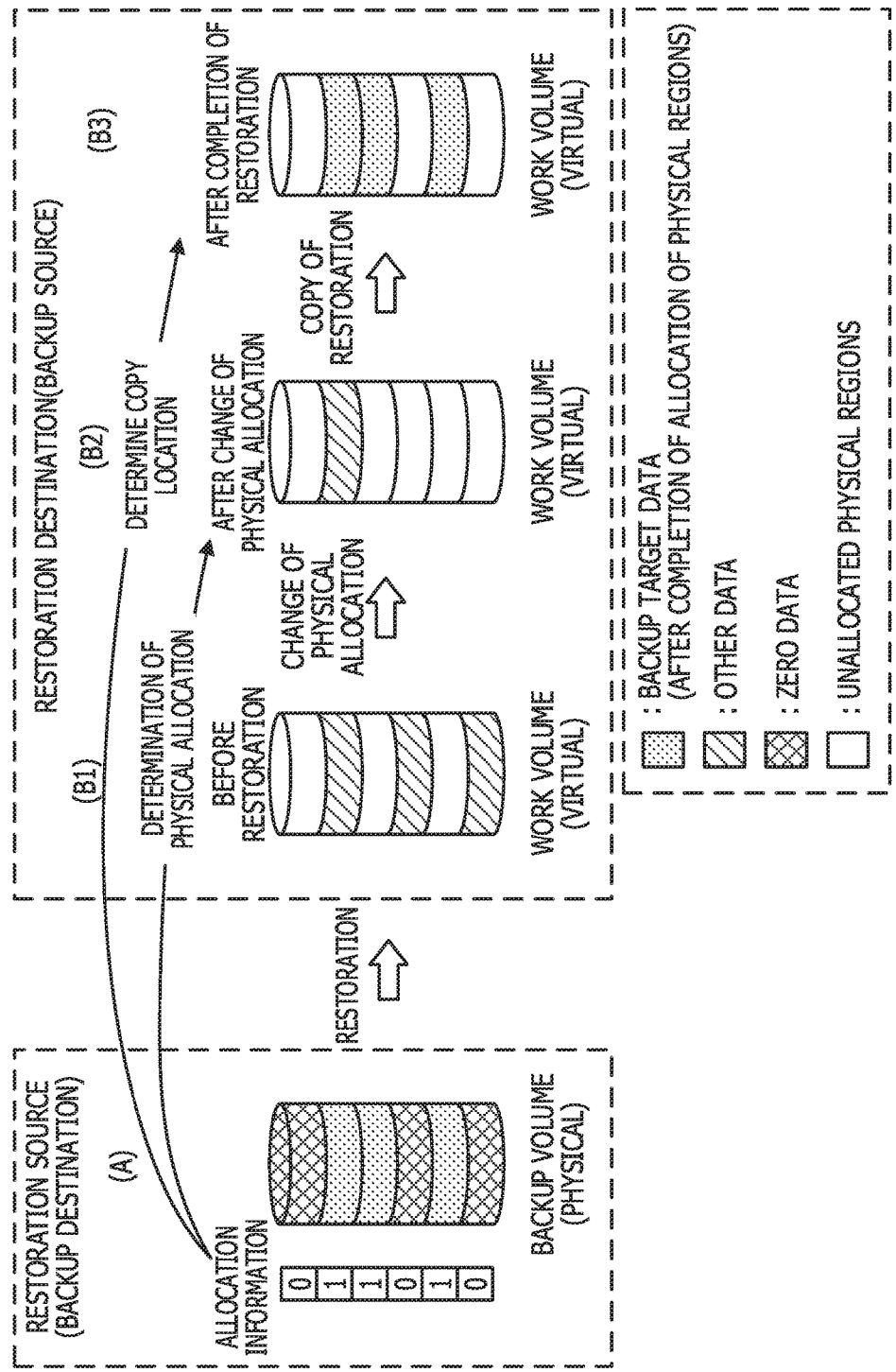
FIG. 7 illustrates an action example of restoration to a virtual volume from a physical volume in the storage control device of the embodiment.

Next, an action example of restoration to a virtual volume from a physical volume in the storage control device of the embodiment will be described. FIG. 7 illustrates an action example of restoration to a virtual volume from a physical volume in the storage control device of the embodiment. This is the restoration of the above-mentioned pattern B, and the action thereof corresponds to the backup in pattern C that was described above with reference to FIG. 3.

In FIG. 7, during restoration, firstly, information that indicates a physical allocation status that corresponds to a restoration source volume is acquired ((A) in FIG. 7). This information is the information that was acquired and saved during backup. Next, the physical allocation state of the restoration destination volume is changed based on information that indicates the physical allocation status ((B2) in FIG. 7). At this point in time, regions of the restoration destination volume that correspond to unallocated regions of the restoration source volume attain an unallocated state. After this, restoration target data that is stored in the restoration source volume is specified based on information that indicates the physical allocation status, and the restoration target data is copied to the restoration destination volume ((B3) in FIG. 7). In this manner, information that indicates the physical allocation status of the restoration source volume before the initiation of restoration is acquired, and an efficient restoration process is realized by performing restoration by applying the information. Since the information that indicates the physical allocation status that is used in the restoration is information that is acquired during backup, the information has already been created during restoration. Accordingly, during restoration, the time and load to create the information that indicates the physical allocation status is reduced. In addition, in the restoration destination volume, an allocation status that is the same as the allocation status of physical regions of the backup source volume during backup acquisition that acquires restoration target data, is reproduced.

Embodiment

In the following description, a copy source indicates either a backup source or a restoration source, and a copy destination indicates either a backup destination or a restoration destination.

Figure 8:
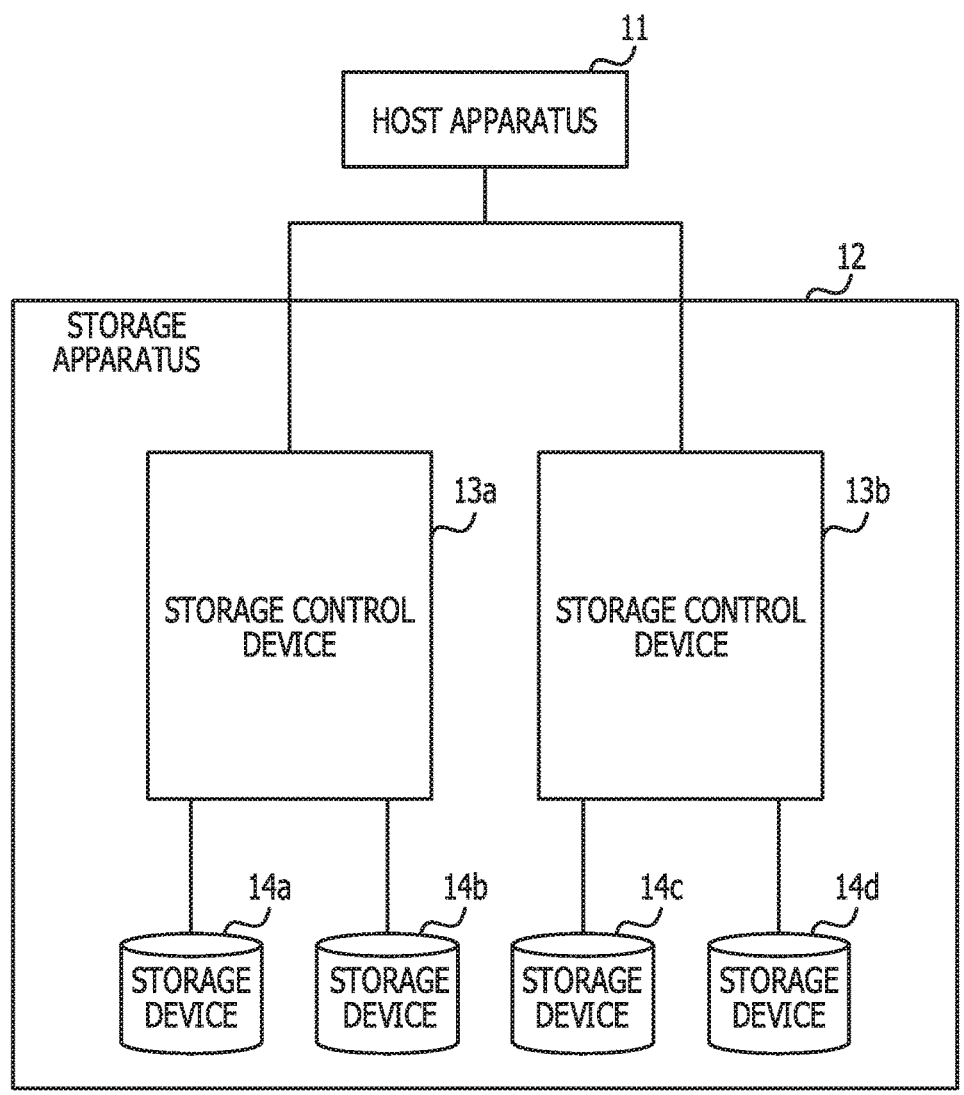
FIG. 8 illustrates an example of a configuration of a storage system according to the embodiment.

FIG. 8 illustrates an example of a configuration of a storage system according to the embodiment. In FIG. 8, the storage system includes a host apparatus 11, and a storage apparatus 12. The host apparatus 11 and the storage apparatus 12 are coupled via a communication network or the like.

The host apparatus 11 transmits backup instructions and restoration instructions to the storage apparatus 12. Further, the host apparatus 11 receives backup instructions and restoration instructions from the storage apparatus 12.

The storage apparatus 12 includes one or more storage control devices 13 (13a and 13b), and one or more storage devices 14 (14a to 14d). The storage control devices 13 and the one or more storage devices 14 are coupled via a bus, an interconnection or a communication network. The storage control devices 13 may perform unified management of a plurality of storage devices 14 as a storage pool. In addition, the storage control devices 13 may include a storage virtualization function such as thin provisioning, and may manage a logical volume as a virtual volume. The storage control devices variably allocate storage regions of the storage pool to virtual volumes depending on the usage statuses of the volumes. In addition, the storage control devices 13 may include an advanced copy function such as OPC or Quick OPC, and the backup of data stored on a work volume may be implemented by firmware of the storage control devices 13 without using the resources of a server.

Figure 9:
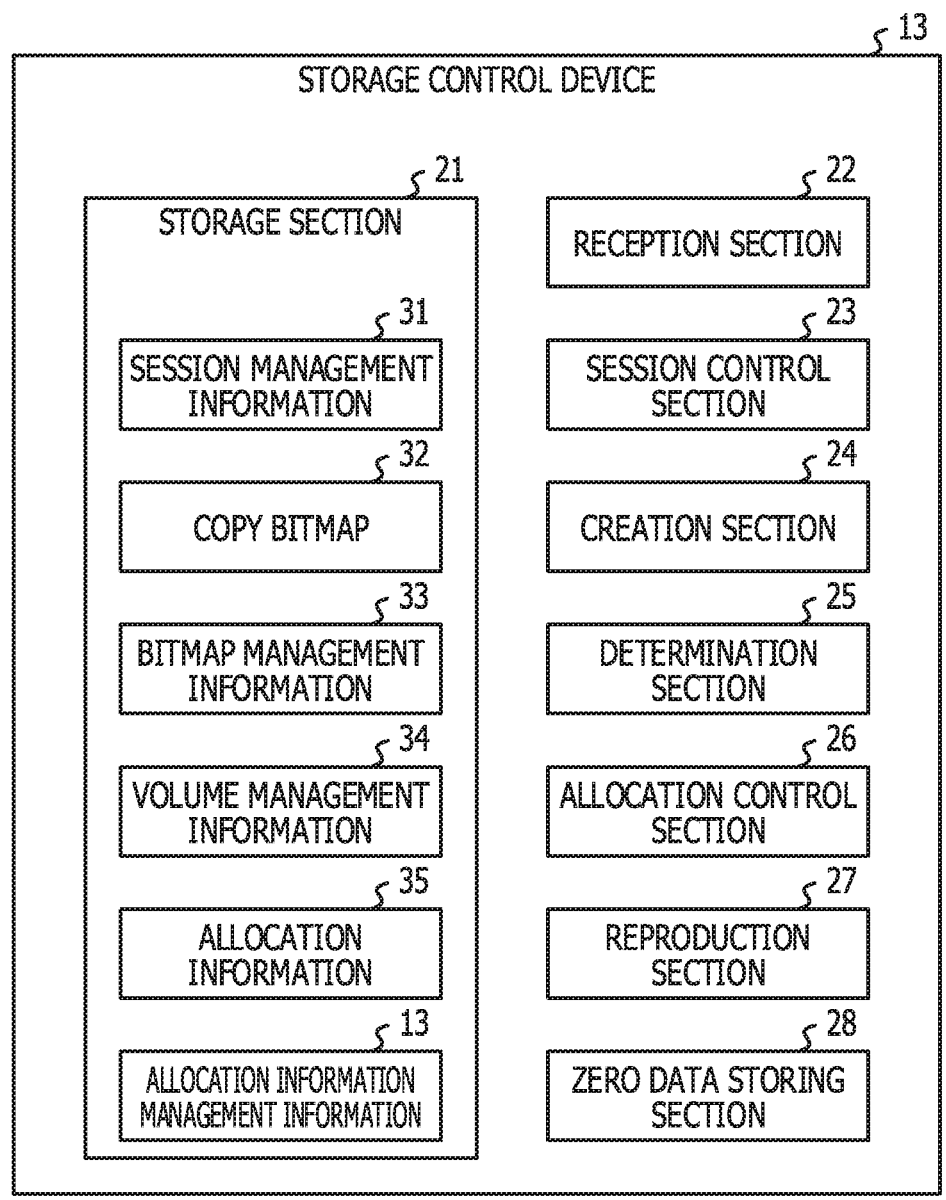
FIG. 9 illustrates an example of a configuration of the storage control device.

FIG. 9 illustrates an example of a configuration of a storage control device 13. In FIG. 9, the storage control device 13 includes a storage section 21, a reception section 22, a session control section 23, a creation section 24, a determination section 25, an allocation control section 26, a reproduction section 27 and a zero data storing section 28.

The storage control device 13 is an example of the storage control device 1. The reception section 22 is an example of the reception section 2 and the restoration instruction reception section 7. The creation section 24 is an example of the creation section 3 and the storing processing section 6. The determination section 25 is an example of the acquisition section 8. The allocation control section 26 and the zero data storing section 28 are an example of the region control section 4 and the acquisition section 8. The reproduction section 27 is an example of the backup control section 5 and the restoration control section 9.

The storage section 21 stores session management information 31, a copy bitmap 32, bitmap management information 33, volume management information 34, allocation information 35, and allocation information management information 36. The session management information 31 is control information of a copy session. The copy bitmap 32 is information that indicates a copy status of a copy target region. The bitmap management information 33 is management information of the copy bitmap 32. The volume management information 34 is management information of a volume. The allocation information 35 is information that indicates an allocation status of physical regions of a backup source virtual volume during backup. The allocation information management information 36 is management information of the allocation information 35. The details of each type of information will be described later.

The reception section 22 receives backup instructions and restoration instructions from the host apparatus 11. The backup instructions and the restoration instructions are, for example, OPC or Quick OPC commands. Identification information of a backup source volume and a backup destination volume, and information that indicates a target range of the backup is included in a backup instruction. Identification information of a restoration source volume and a restoration destination volume, and information that indicates a target range of the restoration is included in a restoration instruction.

The session control section 23 performs initiation control of a session depending on an instruction that the reception section 22 receives. That is, the session control section 23 creates information that relates to a session to be initiated. For example, the session control section 23 creates the session management information 31, the copy bitmap 32 and the bitmap management information 33 depending on a backup instruction or a restoration instruction, and stores the session management information 31, the copy bitmap 32 and the bitmap management information 33 in the storage section 21. In addition, the session control section 23 updates the volume management information 34 depending on a backup instruction or a restoration instruction. In a case where there is not a copy destination volume, the session control section 23 may create a new copy destination volume. The volume management information 34 is set to information that is stored in the storage section 21 in advance, but in a case where this is not present, the session control section 23 may create the volume management information 34 along with the session management information 31 and the like.

In this instance, each item of information that is created or set by the session control section 23 will be described in order.

Firstly, the session management information 31 will be described. The session management information 31 is control information of a copy session. FIG. 10 illustrates an example of a configuration of the session management information 31.

In FIG. 10, the session management information 31 includes data items of a "session ID", a "state", a "phase", "copy source identification information", a "copy source initiation address", "copy destination identification information", a "copy destination initiation address", and a "copy size". Furthermore, the session management information 31 includes data items of a "mode", a "bitmap management information pointer (Top)", a "bitmap management information pointer (Btm)", a "session management information pointer (Next)", and a "session management information pointer (Prev)".

The "session ID" is identification information for identifying a copy session. The "state" indicates whether or not a current session is progressing as normal. The "phase" indicates a copy state. The copy state is, for example, a value that indicates whether or not a copy process is currently copying.

The "copy source identification information" indicates identification information of a copy source volume. The "copy source identification information" is, for example, a logical unit number (LUN) number of the copy source volume. The "copy source initiation address" is an address that indicates an initiation position of a copy target range in the copy source volume. The copy target range is a range of a region in which data of a copy target is stored. This range is information that is designated by a backup instruction or a restoration instruction. The address is, for example, represented by LBA.

The "copy destination identification information" indicates identification information of a copy destination volume. The "copy destination identification information" is, for example, a LUN number of the copy destination volume. The "copy destination initiation address" is an address that indicates logical block addressing (LBA), which indicates an initiation position of a copy target range in the copy destination volume.

The "copy size" indicates a size of the copy target range. That is, data of a size that is indicates by the copy size is copied from the copy source initiation address to a region in which the copy destination initiation address is set as the beginning thereof. The "mode" indicates a copy mode. The copy mode is a value that indicates either backup or restoration.

The "bitmap management information pointer (Top)" indicates a pointer to the beginning bitmap management information 33. The "bitmap management information pointer (Btm)" indicates a pointer to the end bitmap management information 33. The bitmap management information 33 will be mentioned later.

The "session management information pointer (Next)" and the "session management information pointer (Prev)" are pointers for making it possible to retrieve related session management information 31 with a link in a case where the corresponding session is associated with the volume management information 34. The volume management information 34 will be mentioned later. Additionally, session management information 31 that is associated with the same volume management information 34 may, for example, be associated in order from the beginning to the end of the initiation time of the session.

Next, the copy bitmap 32 will be described. The copy bitmap 32 indicates a copy target range, and whether or not copy of each unit region of the range has been completed. The copy bitmap 32 is created in a corresponding session.

Figure 11:
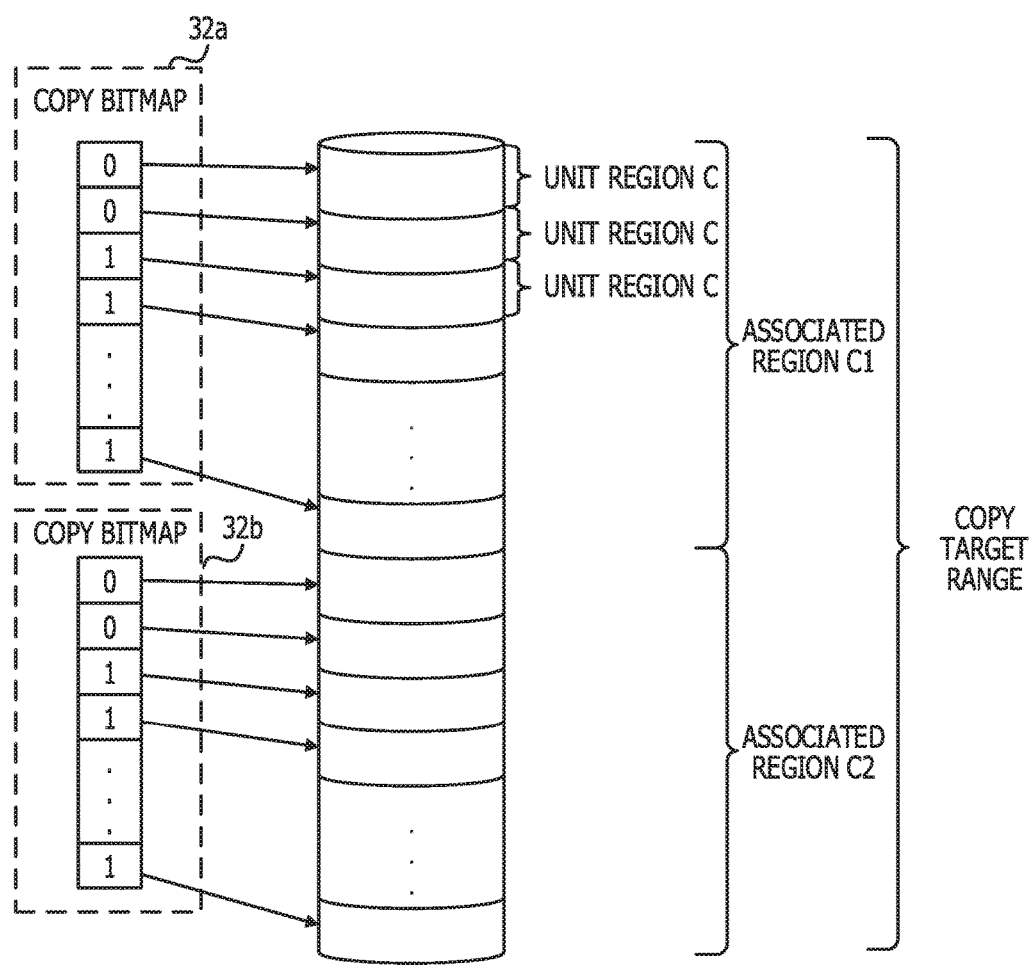
FIG. 11 is a diagram for describing a copy bitmap.

FIG. 11 is a diagram for describing a copy bitmap 32. The copy bitmap 32 includes a plurality of bits. Each bit is associated with respective unit regions (hereinafter, referred to as unit regions C) in which the region of the copy target range is divided into a predetermined size. Further, the fact that copy of the unit region C that corresponds to a bit is not yet complete is indicated in a case where the value of the bit is "1", and the fact that copy of the unit region C that corresponds to a bit has been completed is indicated in a case where the value of the bit is "0". Additionally, the unit region C is, for example, a block.

The size of the copy bitmap 32 is a predetermined size, and for example, is 8K bytes. The bit number that is included in a single copy bitmap 32 corresponds to a predetermined value that depends on the size of the copy bitmap 32. Accordingly, the range of a region in which it is possible to indicate whether or not copy is completed depending on a bit total of a single copy bitmap 32, also corresponds to a predetermined value that depends on the size of the copy bitmap 32. In a case where the copy target range is large, and it is not possible to handle all of the copy target range with a single copy bitmap 32, a plurality of copy bitmaps 32 are created. Each bitmap is associated with partial regions (hereinafter, referred to as associated regions C), which do not overlap with one another in the copy target range. The entire range of the copy target is covered by all of the created bitmaps. A plurality of copy bitmaps that correspond to a single copy target range are mutually associated with one another.

Additionally, as long as the copy bitmap 32 includes information in which it is possible to identify whether or not copy of each unit region C of the copy target range is completed, the copy bitmap 32 is not limited to a bitmap format.

In addition, hereinafter, for the purposes of description, in a case where the copy target range is split into a plurality of associated regions C, the respective associated regions C are discriminated by numbering the plurality of associated regions C in ascending order from a region among the plurality of associated regions C in which the beginning address is smallest. For example, in a case where the copy target range is split into n associated regions C, there are cases where the regions are referred to as an associated region C1, an associated region C2, . . . , associated region Cn in order from a region in which the beginning address of the associated region C is smallest. The copy bitmap that corresponds to the associated region C1 is a beginning copy bitmap, and the copy bitmap that corresponds to the associated region Cn is an end copy bitmap.

Next, the bitmap management information 33 will be described. The bitmap management information 33 is management information of the copy bitmap 32. The bitmap management information 33 corresponds to the copy bitmap 32 on a one-to-one basis. That is, in a case where a plurality of the copy bitmaps 32 are created, an equal number of the bitmap management information 33 is created. The bitmap management information 33 is created with the copy bitmap 32 in a corresponding session.

FIG. 12 is a diagram for describing the bitmap management information 33. In FIG. 12, the bitmap management information 33 includes data items of a "bitmap classification", a "bitmap management information pointer (Next)", a "bitmap management information pointer (Prev)", and a "copy bitmap address".

The "bitmap classification" indicates a classification of the copy. For example, the "bitmap classification" indicates whether or not a corresponding session is a session in a backup or a session in a restoration. Additionally, this value is coordinated with the "mode" of the session management information 31.

The "bitmap management information pointer (Next)" and the "bitmap management information pointer (Prev)" are pointers that are associated with other copy bitmaps 32 that were created in a corresponding session. A plurality of copy bitmaps 32 that correspond to a copy target range of the same copy session are associated with one another depending on the positional relationships in the copy target range of the associated regions C that the copy bitmaps 32 respectively correspond to. Information for managing this association is the "bitmap management information pointer (Next)" and the "bitmap management information pointer (Prev)". The details thereof will be described later using FIG. 13.

The "copy bitmap address" indicates an address of the copy bitmap 32 that a corresponding bitmap management information 33 manages.

Figure 13:
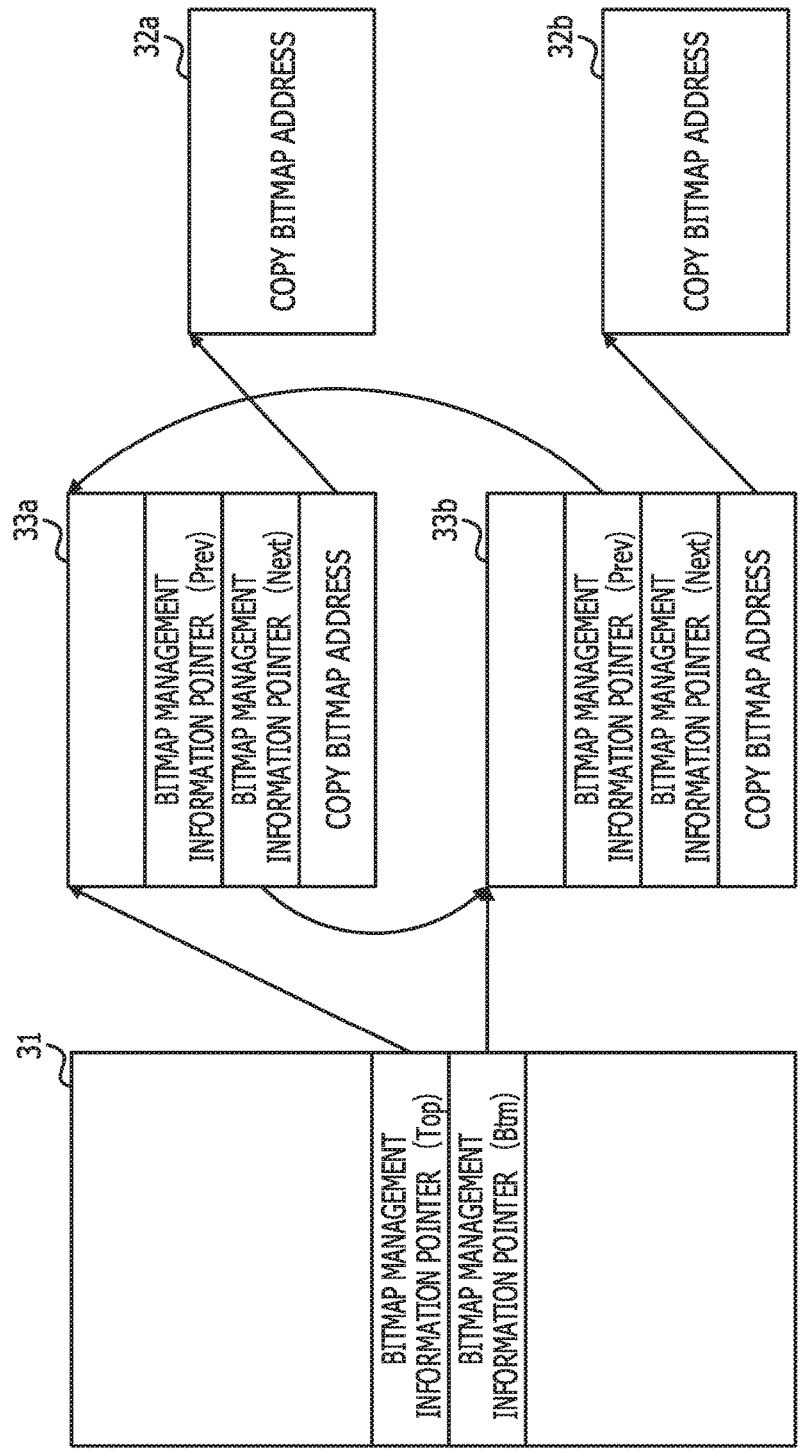
FIG. 13 is a diagram for describing an association between a copy bitmap, copy bitmap management information, and session management information.

In this instance, an association between the session management information 31, the copy bitmap 32 and the bitmap management information 33 will be described. FIG. 13 is a diagram for describing an association between the session management information 31, the copy bitmap 32 and the bitmap management information 33.

In FIG. 13, a pointer to bitmap management information 33a is stored in the "bitmap management information pointer (Top)" of the session management information 31. Further, the address of a copy bitmap 32a is stored in the "copy bitmap address" of the bitmap management information 33a. As a result of this, the copy bitmap 32, which corresponds to the associated region C1 in the session of the session management information 31, is indicated as being the copy bitmap 32a.

In addition, a pointer to bitmap management information 33b is stored in the "bitmap management information pointer (Next)" of the bitmap management information 33a. In addition, a pointer to bitmap management information 33b is stored in the "bitmap management information pointer (Btm)" of the session management information 31. Furthermore, the address of a copy bitmap 32b is stored in the "copy bitmap address" of the bitmap management information 33b. As a result of this, the copy bitmap 32, which corresponds to the associated region C2 in the session of the session management information 31, is indicated as being the copy bitmap 32b.

Next, the volume management information 34 will be described. The volume management information 34 is management information of a volume. The volume management information 34 is created in association with each volume. FIG. 14 illustrates an example of a configuration of the volume management information 34.

In FIG. 14, the volume management information 34 includes data items of a "state", a "volume type", a "copy source session (Top)", and a "copy source session (Btm)". Furthermore, the volume management information 34 includes data items of a "copy destination session (Top)", a "copy destination session (Btm)", a "pointer to allocation information management information (Top)", and a "pointer to allocation information management information (Btm)".

The "state" indicates a state of the corresponding volume. The state of the volume is, for example, either normal or abnormal. The "volume type" indicates a type of the corresponding volume. The volume type is, for example, either a physical volume or a virtual volume.

In a case where there is a copy session that sets the corresponding volume to be a copy source, the "copy source session (Top)" is a pointer that points to the beginning session management information 31 that corresponds to the copy session. In a case where there is a copy session that sets the corresponding volume to be a copy source, the "copy source session (Btm)" is a pointer that points to the end session management information 31 that corresponds to the copy session.

In a case where there is a copy session that sets the corresponding volume to be a copy destination, the "copy destination session (Top)" is a pointer that points to the beginning session management information 31 that corresponds to the copy session. In a case where there is a copy session that sets the corresponding volume to be a copy destination, the "copy destination session (Btm)" is a pointer that points to the end session management information 31 that corresponds to the copy session.

In a case where the corresponding volume is designated as the backup destination, the "pointer to allocation information management information (Top)" is a pointer that points to the allocation information management information 36 that manages the allocation information 35 of the backup source volume. In a case where there are a plurality of items of allocation information 35 of the backup source volume, this pointer corresponds to a pointer that points to the allocation information management information 36 that manages the beginning allocation information 35. In a case where the corresponding volume is designated as the backup destination, the "pointer to allocation information management information (Btm)" is a pointer that points to the allocation information management information 36 that manages the allocation information 35 of the backup source volume. In a case where there are a plurality of items of allocation information 35 of the backup source volume, this pointer corresponds to a pointer that points to the allocation information management information 36 that manages the end allocation information 35. The allocation information 35 and the allocation information management information 36 will be mentioned later.

In this instance, an association between the session management information 31 and the volume management information 34 will be described with reference to FIG. 15.

Figure 15:
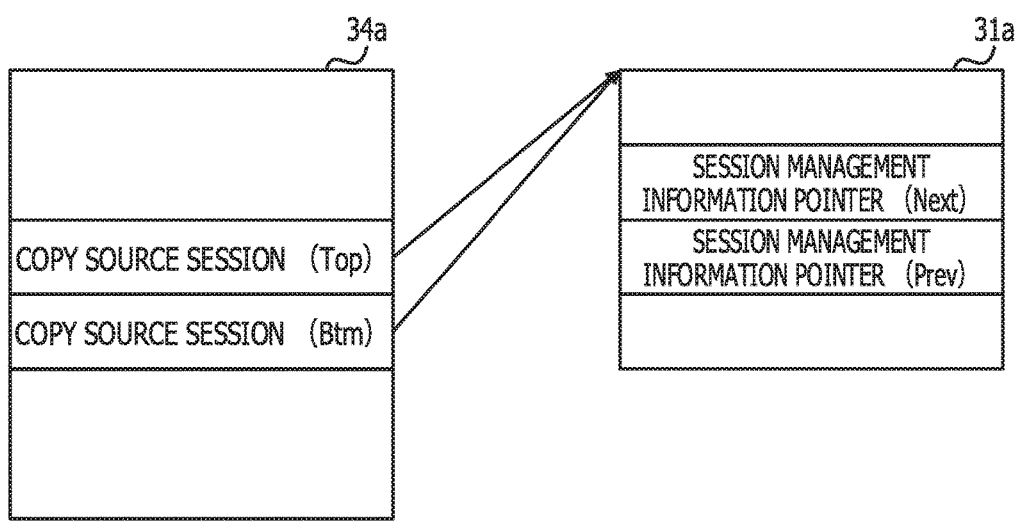
FIG. 15 is a diagram for describing an association between session management information, and volume management information that corresponds to a backup source volume.

FIG. 15 is a diagram for describing an association between the session management information 31, and the volume management information 34 that corresponds to a backup source volume. In FIG. 15, pointers to session management information 31a are stored in the "copy source session (Top)" and the "copy source session (Btm)" of volume management information 34a that corresponds to a predetermined volume a. As a result of this, the fact that the volume a is a copy source volume in a session of the session management information 31a is indicated.

The description of FIG. 9 will be continued. The creation section 24 creates information that indicates a physical allocation status of a backup source volume, and records the information in association with the backup destination volume. That is, in a case where an instruction that the reception section 22 receives is a backup instruction, the creation section 24 creates the allocation information 35 and the allocation information management information 36, and stores the allocation information 35 and the allocation information management information 36 in the storage section 21. Further, the creation section 24 associates the created allocation information management information 36 with the volume management information 34 of the backup destination volume.

For example, the creation section 24 creates the allocation information 35 by checking whether or not physical allocation has been carried out for each unit region of the physical allocation in the copy target range of a virtual volume.

In this instance, the allocation information 35 and the allocation information management information 36 that are created by the creation section will be described in order.

Firstly, the allocation information 35 will be described. The allocation information 35 is information that indicates an allocation status of physical regions in the copy target range of a backup source volume. Additionally, the allocation status of the physical regions is an allocation status at a point in time at which a backup instruction is received. The allocation information 35 is information that is used during restoration for returning to a physical allocation state of the work volume during backup acquisition.

Figure 16:
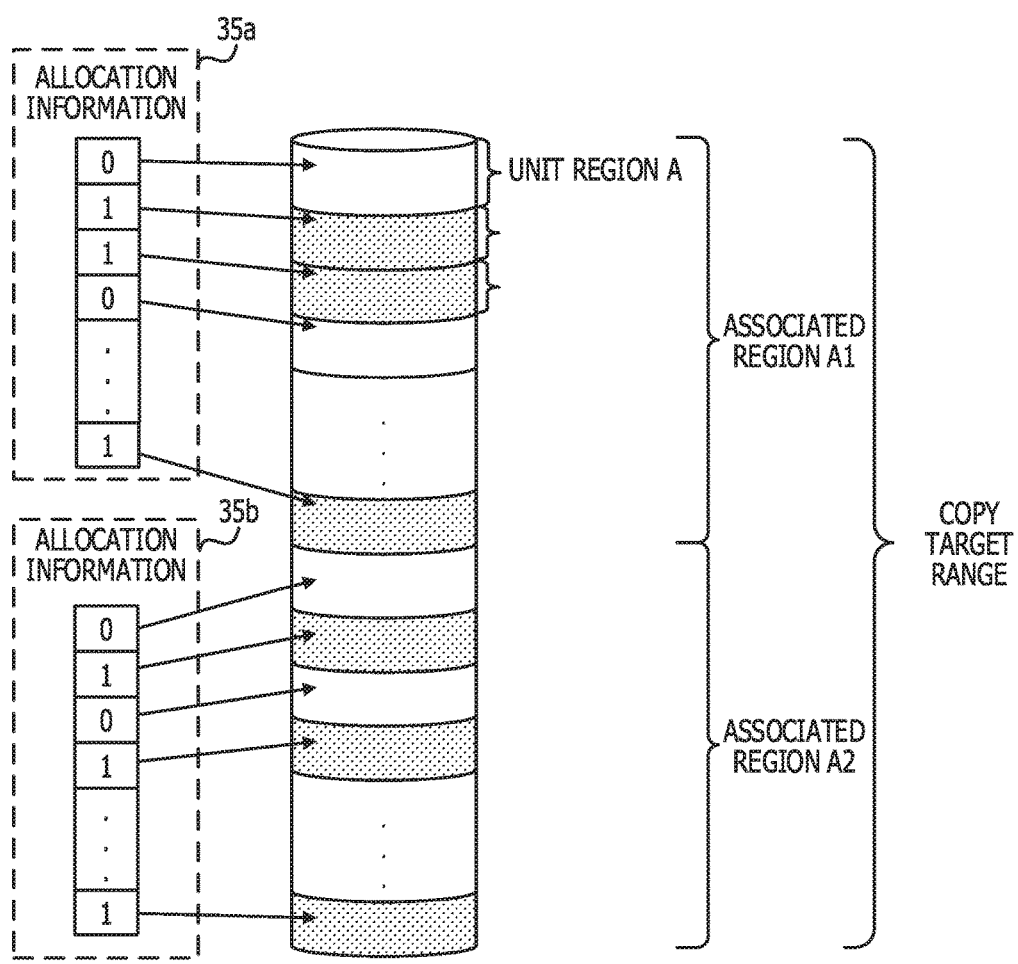
FIG. 16 is a diagram for describing allocation information.

FIG. 16 is a diagram for describing the allocation information 35. The allocation information 35 (35a and 35b) includes a plurality of bits. Each bit is associated with respective unit regions (hereinafter, referred to as unit regions A) in which the copy target range of the backup source volume is divided into a predetermined size. Further, the fact that a physical region has been allocated to a unit region A that corresponds to a bit is indicated in a case where the value of the bit is "1", and the fact that a physical region has not been allocated to a unit region A that corresponds to a bit is indicated in a case where the value of the bit is "0". Additionally, the unit region A is, for example, a chunk. A chunk size may be greater than a block size, and for example, may be an integral multiple of the block size.

In the same manner as the copy bitmap 32, the size of the allocation information 35 is a predetermined size. A bit number that is capable of including a single allocation information 35 corresponds to a predetermined value that depends on the size of the allocation information 35. Accordingly, the range of a region in which it is possible to indicate an allocation status using a bit total of a single item of allocation information 35 also corresponds to a predetermined value that depends on the size of the allocation information 35. In a case where the size of copy target range is large, and it is not possible to handle all of the copy target range with a single item of allocation information 35, a plurality of items of allocation information 35 are created. Each allocation information 35 is associated with partial regions (hereinafter, referred to as associated regions A), which do not overlap with one another in the copy target range. The entire copy target range is covered by all of the created items of allocation information 35.

Additionally, as long as the allocation information 35 includes information in which it is possible to identify the allocation status of each unit region A in the copy source volume, the allocation information 35 is not limited to a bitmap format. For example, the allocation information 35 may be set as information that associates identification information that identifies the copy source volume, identification information that identifies each unit region A of the copy source volume, and information that indicates the allocation state of each unit region A, with one another.

In addition, hereinafter, for the purposes of description, in a case where the copy target range is split into a plurality of associated regions A, each associated region A is discriminated by numbering the plurality of associated regions A in ascending order from a region among the plurality of associated regions A in which the beginning address is smallest. For example, in a case where the copy target range is split into n associated regions A, there are cases where the regions are referred to as an associated region A1, an associated region A2, . . . , associated region An in order from a region in which the beginning address of the associated region A is smallest. The allocation information 35 that corresponds to the associated region A1 is the beginning allocation information 35. The allocation information 35 that corresponds to the associated region An is the end allocation information 35.

Next, the allocation information management information 36 will be described. The allocation information management information 36 is information that manages the allocation information 35. FIG. 17 illustrates an example of a configuration of the allocation information management information 36. In FIG. 17, the allocation information management information 36 includes data items of "identification information of the session management information", a "pointer to the allocation information management information (Next)", a "pointer to the allocation information management information (Prev)" and an "address of the allocation information".

The "identification information of the session management information" is identification information of the session management information 31 of a corresponding copy session. The corresponding copy session refers to a copy session that is created by the allocation information 35, which the corresponding allocation information management information 36 manages.

The "pointer to the allocation information management information (Next)" is a pointer for associating items of allocation information management information 36 that are created by the corresponding copy session.

The "pointer to the allocation information management information (Prev)" is a pointer for associating items of allocation information management information 36 that are created by the corresponding copy session.

The "address of the allocation information" indicates an address of the allocation information 35 that the corresponding allocation information management information 36 manages.

When the allocation information 35 and the allocation information management information 36 are created, the creation section 24 associates allocation information management information 36 with the volume management information 34 of the backup destination volume. For example, the creation section 24 sets the address of the created allocation information management information 36 to the "pointer to allocation information management information (Top)" and the "pointer to allocation information management information (Btm)" in the volume management information 34 of the backup destination volume.

In this instance, an association between the session management information 31, the volume management information 34, the allocation information 35 and the allocation information management information 36 will be described with reference to FIG. 18.

Figure 18:
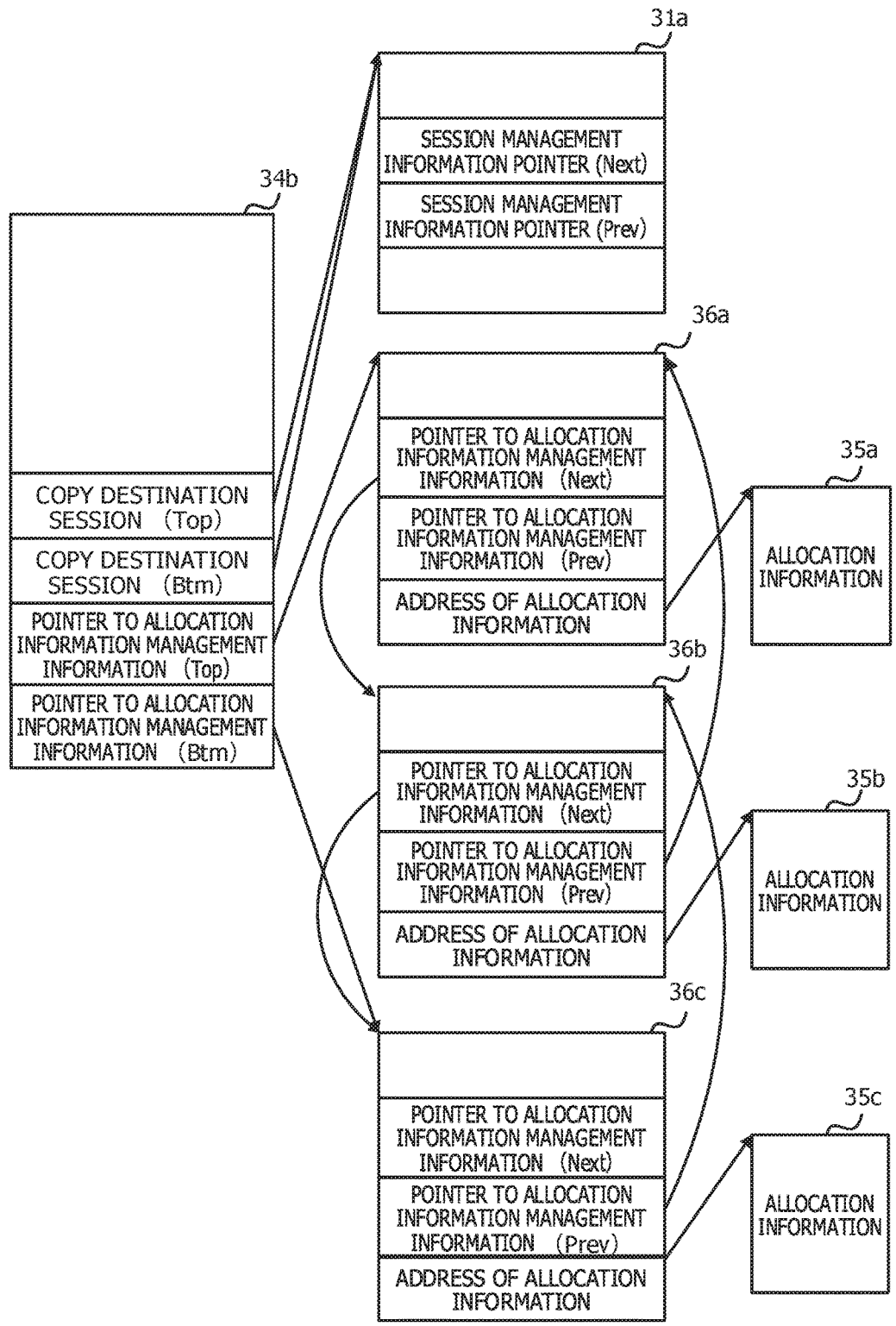
FIG. 18 is a diagram for describing an association between volume management information that corresponds to a backup destination volume, session management information, allocation information management information, and allocation information.

FIG. 18 is a diagram for describing the association between the session management information 31, the volume management information 34, the allocation information 35 and the allocation information management information 36. In FIG. 18, pointers to session management information 31a are stored in the "copy destination session (Top)" and the "copy source session (Btm)" of volume management information 34b that corresponds to a predetermined volume b. As a result of this, the fact that the volume b is a copy destination volume in a session of the session management information 31a is indicated.

In addition, a pointer to allocation information management information 36a is stored in the "pointer to the allocation information management information (Top)" of the volume management information 34b. Further, the address of allocation information 35a is stored in the "address of the allocation information" of the allocation information management information 36a. As a result of this, the fact that the allocation status of a beginning associated region A1 of the volume b is indicated by the allocation information 35a, is indicated.

In addition, a pointer to allocation information management information 36b is stored in the "pointer to the allocation information management information (Nxt)" of the allocation information management information 36a. Further, the address of allocation information 35b is stored in the "address of the allocation information" of the allocation information management information 36*b*. As a result of this, the fact that the allocation status of an associated region A2 is indicated by the allocation information 35*b*, is indicated.

In addition, a pointer to allocation information management information 36*c* is stored in the "pointer to the allocation information management information (Nxt)" of the allocation information management information 36*b*. Further, the address of allocation information 35*c* is stored in the "address of the allocation information" of the allocation information management information 36*c*. As a result of this, the fact that the allocation status of an associated region A3 is indicated by the allocation information 35*c*, is indicated.

The description of FIG. 9 will be continued. In a case where the copy source volume in the copy session is a virtual volume, the determination section 25 determines a true copy region that is the target of an effective data copy. For example, the determination section 25 performs control so that, among the copy source virtual volume, regions in which physical allocation has not been performed, are not copy targets since data is not stored therein. As a result of this, wasteful copy actions are suppressed.

For example, the determination section 25 changes the copy bitmap 32 based on the allocation information 35. That is, the determination section 25 extracts unallocated regions in which "0" is set by referring to the allocation information 35. Further, the determination section 25 updates the value of bits that correspond to extracted unallocated regions to "0" in the copy bitmap 32.

Figure 19:
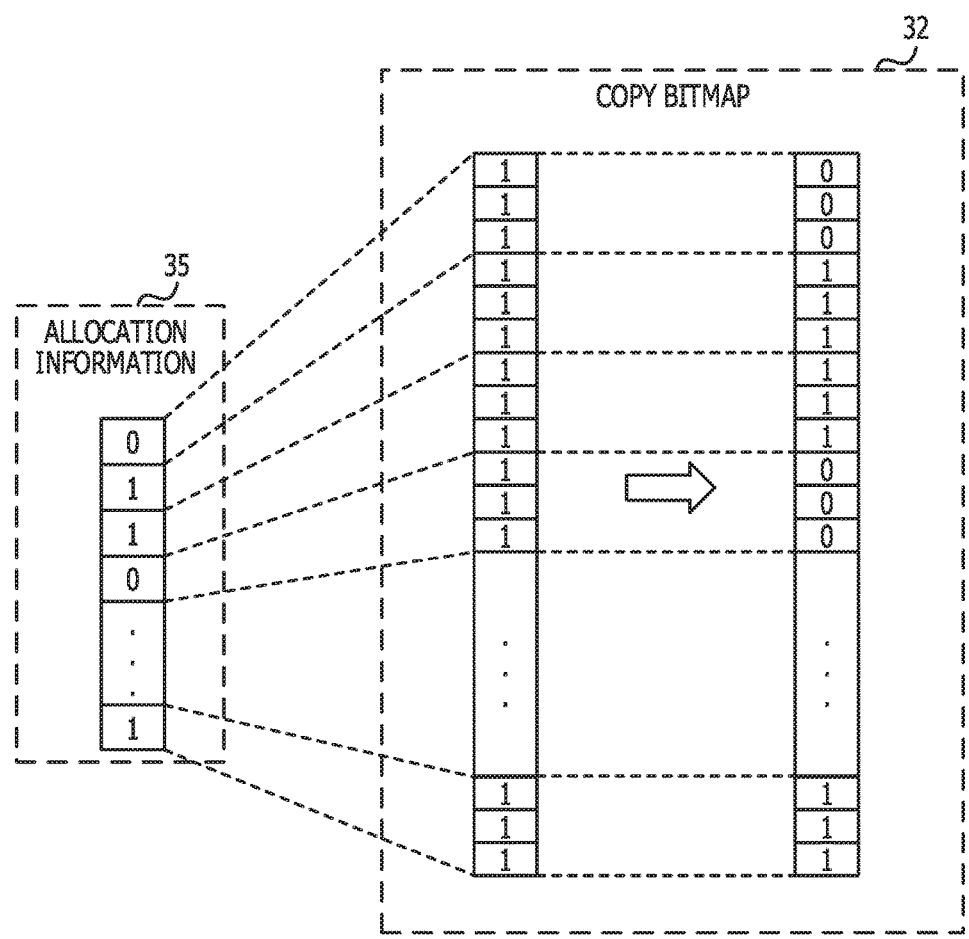
FIG. 19 illustrates an example of the update of a copy bitmap by a determination section.

FIG. 19 illustrates an example of the update of the copy bitmap 32 by the determination section 25. The example of FIG. 19 illustrates an example in which unit regions A that each bit of the allocation information 35 indicate, correspond to three unit regions C that each bit of the copy bitmap 32 indicates. As illustrated in FIG. 19, the bits of the copy bitmap 32 that correspond to regions in which the bits of the allocation information 35 are "0", are changed from "1" to "0".

Additionally, a reference source of the allocation information 35 differs between backup and restoration. In a case of backup, the determination section 25 refers to the allocation information 35 that is created by the creation section 24. This allocation information 35 is information that indicates the allocation state of the copy source (backup source) virtual volume. In a case of restoration, the determination section 25 refers to the allocation information 35 that is stored in the storage section 21 in association with the restoration source volume. This allocation information 35 is information that indicates the allocation state of the restoration source volume, but is also information that indicates the allocation state of the backup source virtual volume at a point in time of backup to the restoration source volume.

The allocation control section 26 changes the allocation state of the copy destination virtual volume so that the physical allocation state of the copy destination virtual volume is the same as the physical allocation state of the copy source virtual volume at a point in time at which the copy session is completed. For example, the allocation control section 26 changes the physical allocation of the copy destination virtual volume based on the physical allocation information 35 of the copy source virtual volume. The change process is performed in a case where both of the volumes of the copy source and the copy destination are virtual volumes.

For example, firstly, the allocation control section 26 extracts unallocated regions in which "0" is set by referring to the allocation information 35. Next, the allocation control section 26 checks whether or not physical allocation has been carried out in the regions of copy destination virtual volume that correspond to the extracted unallocated regions. In a case where physical allocation has been carried out, the allocation control section 26 releases the regions of the copy destination virtual volume.

Additionally, the allocation control section 26 may change the allocation of the copy destination virtual volume so that the allocation statuses of the copy source and the copy destination are the same based on the allocation information 35.

The reproduction section 27 copies the data of the true copy regions that were determined by the determination section 25 to the copy destination volume. The true copy regions are specified based on the copy bitmap 32. For example, the reproduction section 27 copies the data of regions in which "1" is set by referring to the copy bitmap 32. Further, the reproduction section 27 updates the bits of the copy bitmap 32 that correspond to the unit regions C in which copy has been performed, from "1" to "0" each time copy of the data of the regions in which "1" is set, is completed. Additionally, in a case where physical regions have not been allocated to the copy destination volume, the reproduction section 27 stores the copy data after allocating physical regions using a function of thin provisioning.

In a case where the copy source volume is a virtual volume, and the copy destination volume is a physical volume, the zero data storing section 28 stores zero data in regions of the copy destination volume that correspond to unallocated regions of the copy source volume. The specification of the unallocated regions of the copy source volume is performed based on the allocation information 35.

For example, firstly, the zero data storing section 28 extracts unallocated regions in which "0" is set by referring to the allocation information 35. Further, the zero data storing section 28 stores zero data in the regions of the copy destination physical volume that correspond to the extracted unallocated regions. Additionally, with respect to the storing of the zero data, the zero data storing section 28 may perform storing in the copy destination volume by copying zero data that is stored in a predetermined memory region in advance. The zero data may, for example, be a null value.

In this instance, in the embodiment, the following two points are reasons for the bits of the copy bitmap 32 being "0". Namely, that is, the reasons are that either copy of the corresponding region has been completed (reason (A)), or the bits of the allocation information 35 that correspond to the corresponding region are "0" (reason (B)). The determination of whether or not the reason for the bits of the copy bitmap 32 being "0" is reason (A) or reason (B) is performed based on the allocation information 35. It is determined that the reason is reason (A) in a case where the bits of the copy bitmap 32 are "0", and the bits of the allocation information 35 are "0". In addition, it is determined that the reason is reason (B) in a case where the bits of the copy bitmap 32 are "0", and the bits of the allocation information 35 are "1". In a case where the bits are "0" as a result of reason (B), the zero data storing section 28 stores zero data in the regions of the copy destination physical volume that correspond to the regions.

Additionally, in the manner mentioned above, a reference source of the allocation information 35 differs between backup and restoration. In a case of backup, the determination section 25 refers to the allocation information 35 that is created by the creation section 24. In a case of restoration, the determination section 25 refers to the allocation information 35 that is stored in the storage section 21 in association with the restoration source volume.

Figure 20:
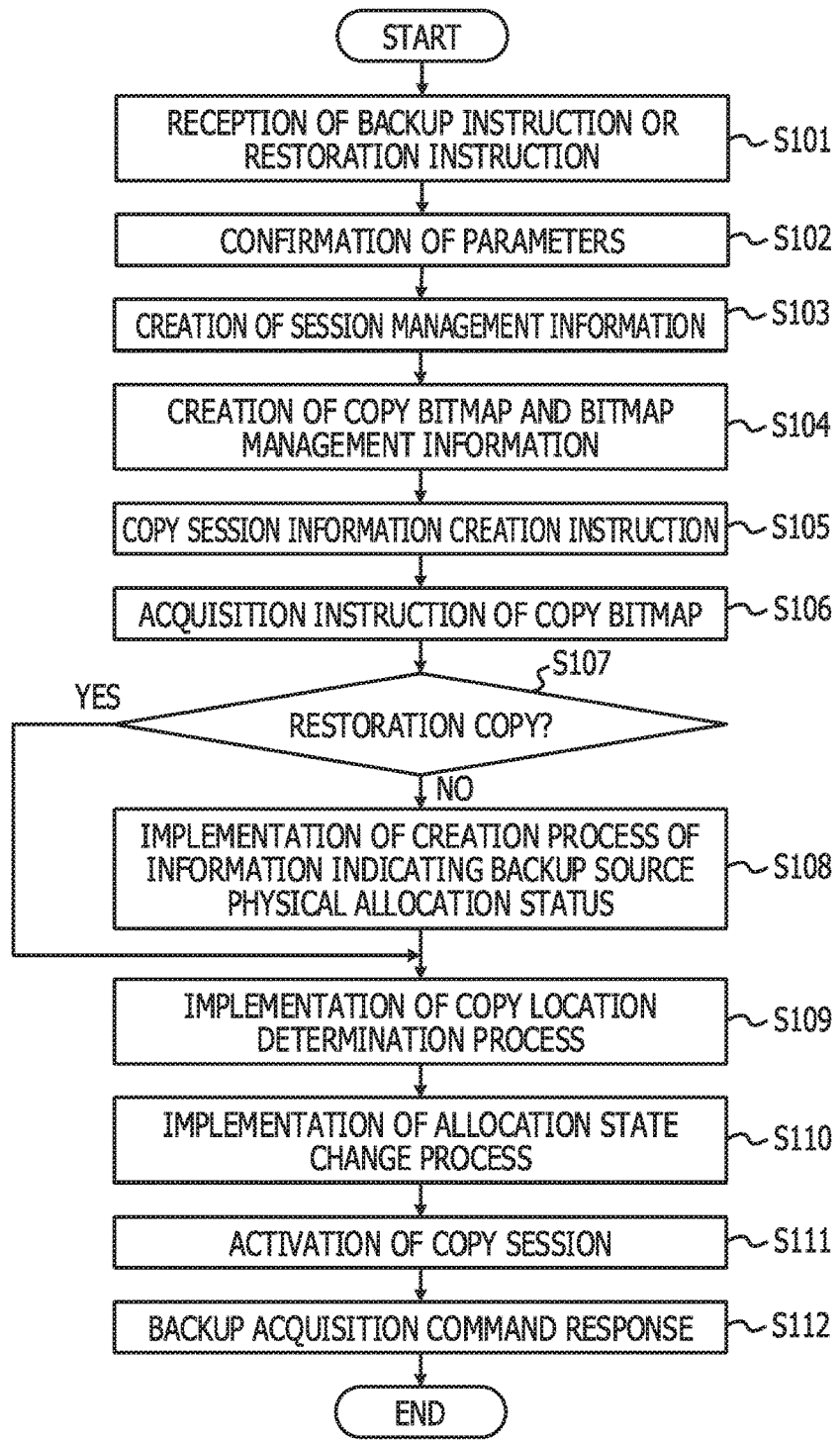
FIG. 20 is an example of a flowchart in which all of the processes of backup and restoration are illustrated.

Next, action flows of backup and restoration will be described with reference to FIGS. 20 to 25. FIG. 20 is an example of a flowchart in which all of the processes of backup and restoration are illustrated.

In FIG. 20, firstly, the reception section 22 receives a backup instruction or a restoration instruction from the host apparatus 11 (S101).

Next, the session control section 23 confirms the parameters of the received backup instruction or restoration instruction (S102). The parameters of a backup instruction are identification information of a backup source volume and a backup destination volume, and information that indicates a target range of the backup. The parameters of a restoration instruction are identification information of a restoration source volume and a restoration destination volume, and information that indicates a target range of the restoration.

Next, the session control section 23 creates the session management information 31 and sets a value to each data item based on the parameters that were confirmed in S102, and stores the session management information 31 in the storage section 21 (S103). In addition, the session control section 23 associates the created session management information 31 with volume management information 34 that corresponds to the copy source volume and the copy destination volume. Additionally, the association is performed as a result of the session control section 23 setting the "copy source session (Top)" and the "copy source session (Btm)" of the volume management information 34 that corresponds to the copy source volume. In addition, the association is performed as a result of the session control section 23 further setting the "session management information pointer (Next)" and the "session management information pointer (Prev)" of the session management information 31.

Next, the session control section 23 creates the copy bitmap 32 and the bitmap management information 33, sets a value to each data item based on the parameters that were confirmed in S102, and stores the copy bitmap 32 and the bitmap management information 33 in the storage section 21 (S104). In addition, the session control section 23 associates the created bitmap management information 33 with the session management information 31. That is, the session control section 23 sets the address of the created copy bitmap 32 to the "bitmap management information pointer (Top)" and the "bitmap management information pointer (Btm)" of the session management information 31.

Next, the session control section 23 instructs another storage control device 13, which is included in the same storage apparatus 12, to create and set the session management information 31 (S105). The session control section 23 of the other storage control device 13, which receives the above-mentioned instruction, creates the session management information 31 and stores the session management information 31 in the storage section in the same manner as S103. In addition, the session control section 23 of the other storage control device 13 associates the created session management information 31 with volume management information 34 that corresponds to the copy source volume and the copy destination volume.

Next, the session control section 23 instructs the other storage control device 13 to create and set the copy bitmap 32 and the bitmap management information 33 (S106). The session control section 23 of the other storage control device 13 creates the copy bitmap 32 and the bitmap management information 33 and stores the copy bitmap 32 and the bitmap management information 33 in the storage section in the same manner as S104. In addition, the session control section 23 of the other storage control device 13 associates the created bitmap management information 33 with the session management information 31. In this manner, as a result of the other storage control device 13 performing the creation and setting of information related the session, even in a case where an obstacle arises in a storage control device 13 that is executing either backup or restoration, it is possible to resume the process using the other storage control device 13.

Next, the session control section 23 determines whether or not the instruction that was received in S101 was a restoration instruction (S107). In a case where it is determined that the instruction was a restoration instruction (Yes in S107), the process transitions to S109.

Meanwhile, in a case where it is determined that the instruction was not a restoration instruction (No in S107), the creation section 24 creates information that indicates a physical allocation status of a backup source volume, and records the information in association with the backup destination volume (S108). That is, the creation section 24 creates the allocation information 35 and the allocation information management information 36, and stores the allocation information 35 and the allocation information management information 36 in the storage section 21. In addition, the creation section 24 associates the created allocation information management information 36 with the volume management information 34 of the backup destination volume. This association is performed as a result of the creation section 24 setting the "pointer to allocation information management information (Top)" and the "pointer to allocation information management information (Btm)" of the volume management information 34. In addition, the association is performed as a result of the creation section 24 further setting the "pointer to the allocation information management information (Next)" and the "pointer to the allocation information management information (Prev)" of the allocation information management information 36. The details of the creation process of the allocation information 35 will be described later with reference to FIG. 21.

Next, the determination section 25 determines a true copy region of the copy target range that was confirmed in S102, which is effectively set as the target of data copy (S109). The details of the determination process of the true copy region will be described later with reference to FIG. 22.

Next, the allocation control section 26 changes the physical allocation of the copy destination virtual volume based on the physical allocation information 35 of the copy source virtual volume (S110). The details of the change process of the physical allocation will be described later with reference to FIG. 23. Additionally, the order of S109 and S110 may be interchanged.

Next, the session control section 23 activates the copy session (S111). When the copy session is activated, the copy of data from the true copy region to the copy destination volume is initiated in the background by the reproduction section 27. The details of the copy process will be described later with reference to FIG. 24.

Next, the session control section 23 carries out a response to the backup instruction or the restoration instruction that was received in S101 (S112). Further, the process is finished.

Figure 21:
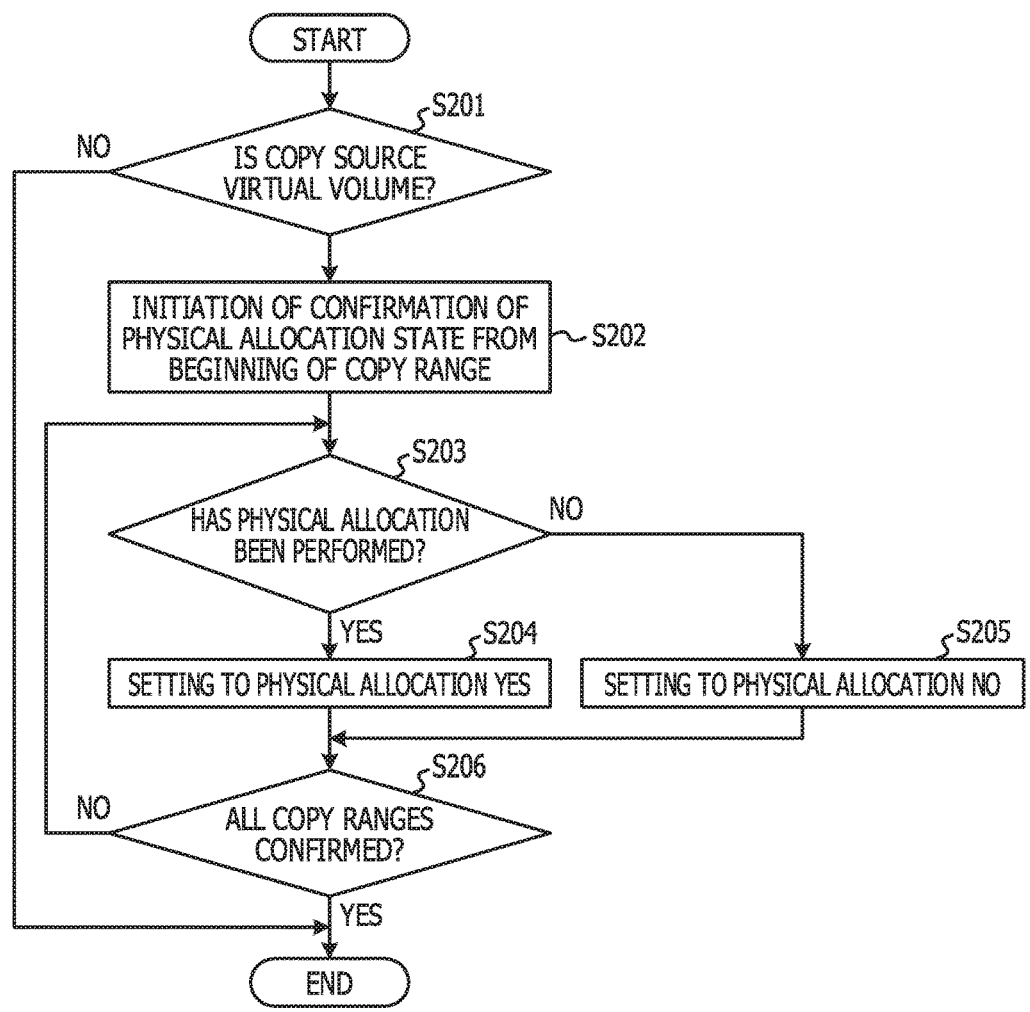
FIG. 21 is an example of a flowchart in which the details of a creation process of allocation information are illustrated.

Next, the details of the creation process of the allocation information 35 that is executed in S108 will be described. FIG. 21 is an example of a flowchart in which the details of a creation process of the allocation information 35 are illustrated.

In FIG. 21, firstly, the creation section 24 determines whether or not the copy source volume is a virtual volume (S201). In a case where it is determined that the copy source volume is not a virtual volume (No in S201), the process is finished.

Meanwhile, in a case where it is determined that the copy source volume is a virtual volume (Yes in S201), the creation section 24 initiates confirmation of whether or not physical regions have been allocated from the beginning of the copy target range of the copy source virtual volume (S202).

Next, the creation section 24 determines whether or not physical regions have been allocated to the unit regions for each unit region A of the allocation (S203). In a case where it is determined that the physical regions have been allocated to the unit regions A (Yes in S203), the creation section 24 sets "1", which indicates that physical regions have been allocated, to the bits that correspond to the unit regions A of the allocation information 35 (S204). Further, the process transitions to S206.

Meanwhile, in a case where it is determined that the physical regions have not been allocated to the unit regions A (No in S203), the creation section 24 sets "0", which indicates that physical regions have not been allocated, to the bits that correspond to the unit regions A of the allocation information 35 (S205).

Next, the creation section 24 determines whether or not it was confirmed in S203 whether or not physical regions had been allocated for the unit regions A of all of the allocations of the copy target range (S206). In a case where it is determined that confirmation of the allocation has not been completed for the unit regions A of any of the allocations of the copy target range (No in S206), the creation section 24 causes the process to transition to S203 again, and performs determination of the unit regions A in which confirmation has not been completed.

Meanwhile, in a case where it is determined that confirmation of the allocation has been completed for all of the unit regions A of the copy target range (Yes in S206), the process is finished.

Figure 22:
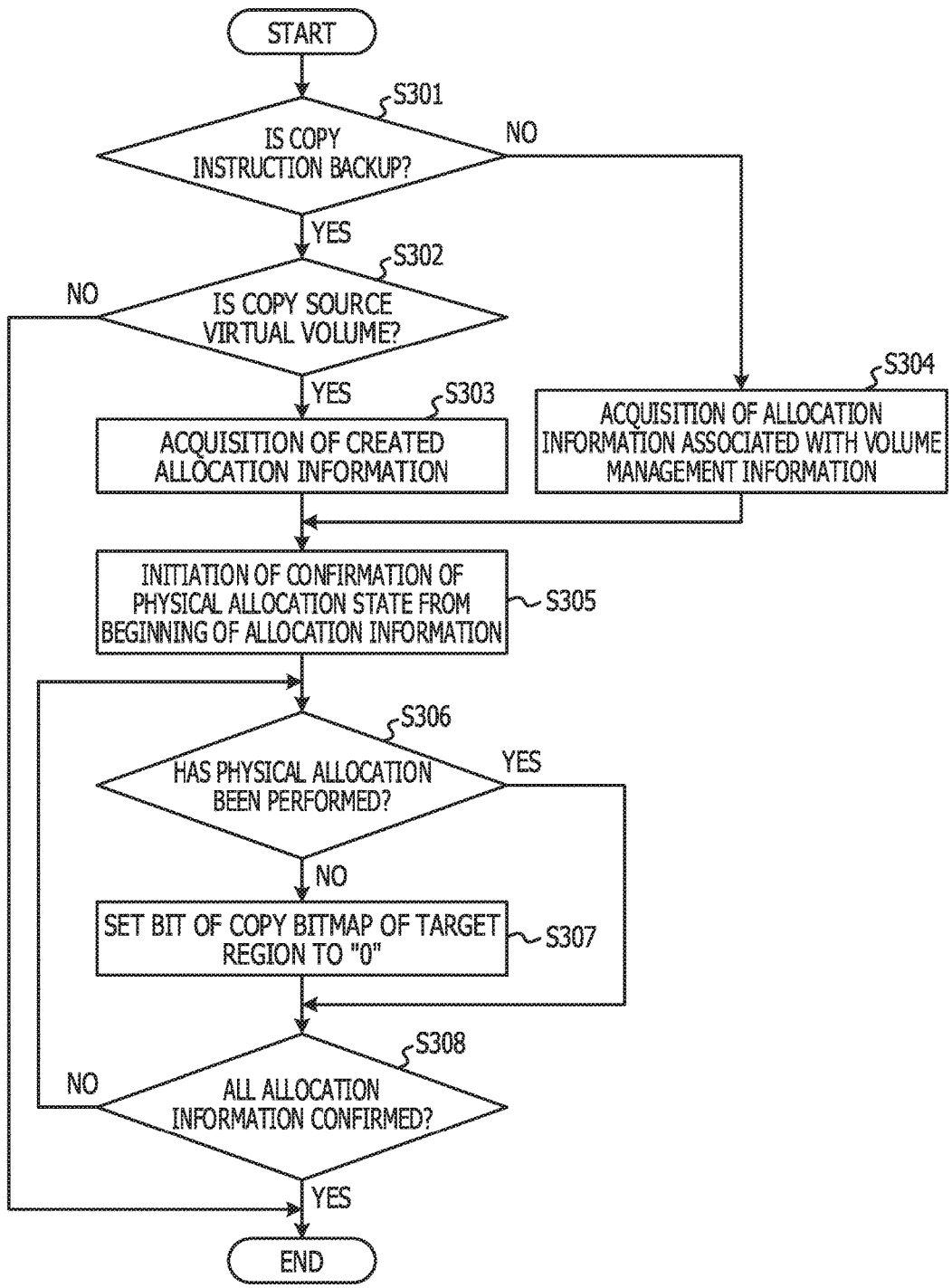
FIG. 22 is an example of a flowchart in which the details of a determination process are illustrated.

Next, the details of the determination process of a true copy region that is executed in S109 will be described. FIG. 22 is an example of a flowchart in which the details of a determination process are illustrated.

In FIG. 22, the determination section 25 determines whether or not the instruction that was received in S101 was a backup instruction (S301). For example, the determination section 25 determines whether or not the instruction was a backup instruction by referring to the "mode" of the session management information 31.

In a case where it is determined that the received instruction was a backup instruction (Yes in S301), the determination section 25 determines whether or not the copy source volume is a virtual volume (S302). For example, the determination section 25 determines whether or not the copy source volume is a virtual volume by referring to the "volume type" of the volume management information 34. In a case where it is determined that the copy source volume is not a virtual volume, that is, in which the copy source volume is a physical volume (No in S302), the process is finished.

Meanwhile, in a case where it is determined that the copy source volume is a virtual volume (Yes in S302), the determination section 25 acquires the allocation information 35 that was created in S108 (S303). Further, the process transitions to S305.

In a case where it is determined that the received instruction was not a backup instruction (No in S301), that is, in a case where the received instruction was a restoration instruction, the determination section 25 specifies and acquires the allocation information 35 that was associated with the restoration source volume (S304). For example, the determination section 25 specifies the allocation information 35 that was associated with the restoration source volume by referring to the "pointer to allocation information management information (Top)" and the "pointer to allocation information management information (Btm)" in the volume management information 34 of the restoration source volume. Additionally, in a case where there are a plurality of items of allocation information 35 that is associated with the restoration source volume, the determination section 25 specifies all of the related items of allocation information 35 by referring to the "pointer to allocation information management information (Next)" and the "pointer to allocation information management information (Prev)" of the allocation information management information 36. In this manner, in restoration, with respect to the allocation information 35, information that was acquired and stored during backup is used. As a result of this, in restoration, the creation of allocation information of the copy source volume is omitted, and an efficient restoration is realized. In addition, as a result of performing the allocation of the copy destination volume or the storing of zero data based on such allocation information, the state of the restoration destination volume is set to the same state as that of the backup source volume during backup acquisition.

Next, the determination section 25 initiates confirmation of the physical allocation state from the beginning for the allocation information 35 that was acquired in either S303 or S304 (S305).

Next, the determination section 25 determines whether or not physical regions have been allocated to the unit storage regions that correspond to bits by confirming whether or not the value of each bit of the allocation information 35 is "1" for each bit of the allocation information 35 (S306). In a case where it is determined that physical regions have been allocated to the unit storage regions that correspond to the bits (Yes in S306), the process transitions to S308.

Meanwhile, in a case where it is determined that physical regions have not been allocated to the unit storage regions that correspond to the bits (No in S306), the determination section 25 updates each bit of the copy bitmap 32 that corresponds to unallocated unit storage regions to "0" (S307). As a result of this, regions in which physical region are unallocated are removed from the true copy region.

Next, the determination section 25 determines whether or not the determination of S306 is completed for all of the bits of the allocation information 35 (S308). In a case where it is determined that determination has not been completed for any one of the bits of the allocation information 35 (No in S308), the determination section 25 causes the process to transition to S306 again, and performs determination for the bits on which determination has not been completed.

Meanwhile, in a case where it is determined that determination of the allocation has been completed for all of the bits of the allocation information 35 (Yes in S308), the process is finished.

Figure 23:
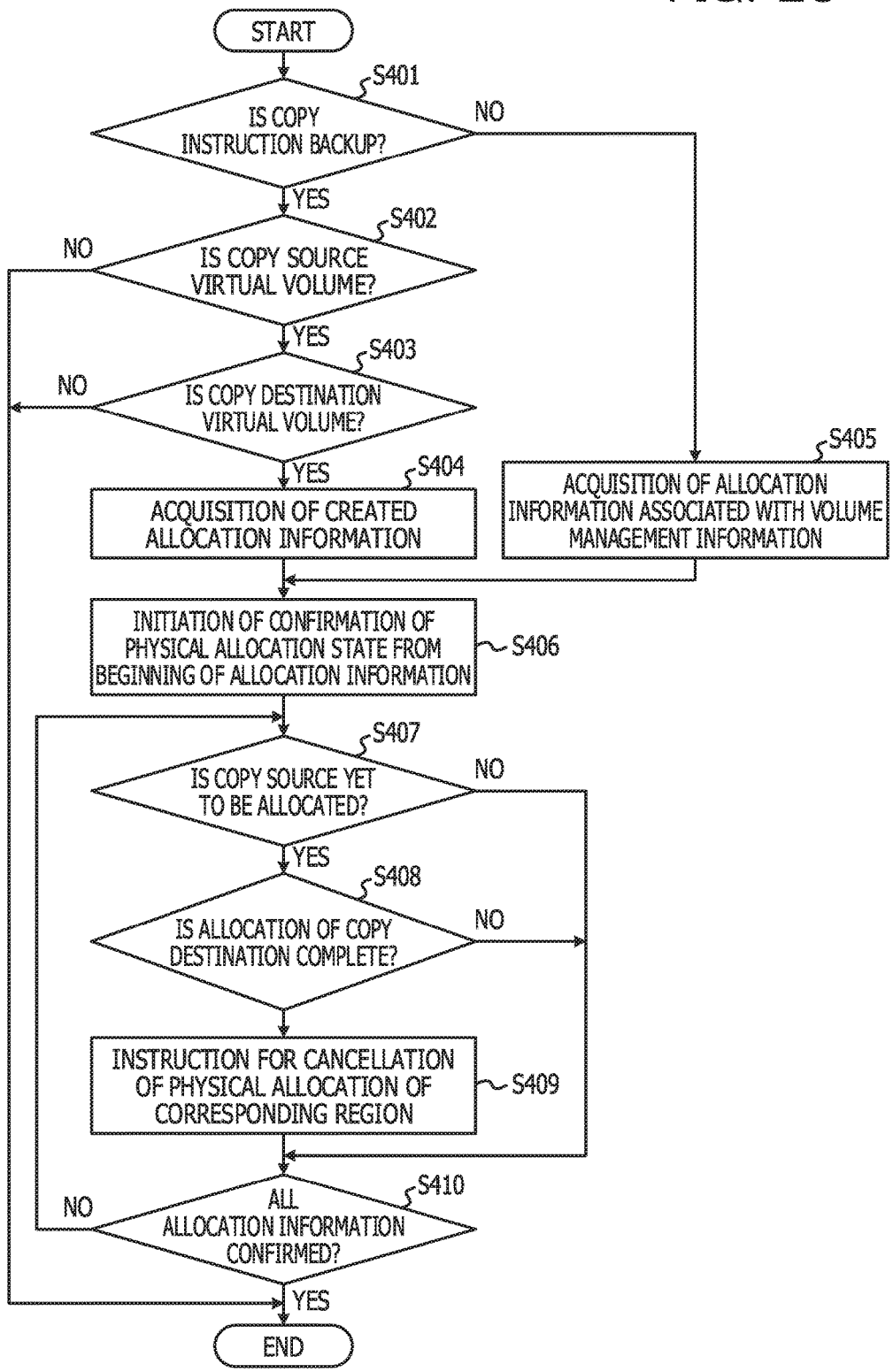
FIG. 23 is an example of a flowchart in which the details of a change process of physical allocation are illustrated.

Next, the details of the change process of the physical allocation that is executed in S110 will be described. FIG. 23 is an example of a flowchart in which the details of a change process of physical allocation are illustrated.

In FIG. 23, the allocation control section 26 determines whether or not the instruction that was received in S101 was a backup instruction (S401). For example, the allocation control section 26 determines whether or not the instruction was a backup instruction by, for example, referring to the "mode" of the session management information 31.

In a case where it is determined that the received instruction was a backup instruction (Yes in S401), the allocation control section 26 determines whether or not the copy source volume is a virtual volume (S402). For example, the allocation control section 26 determines whether or not the copy source volume is a virtual volume by referring to the "volume type" of the volume management information 34, which corresponds to the copy source volume. In a case where it is determined that the copy source volume is not a virtual volume, that is, in which the copy source volume is a physical volume (No in S402), the process is finished.

Meanwhile, in a case where it is determined that the copy source volume is a virtual volume (Yes in S402), the allocation control section 26 determines whether or not the copy destination volume is a virtual volume (S403). For example, the allocation control section 26 determines whether or not the copy destination volume is a virtual volume by referring to the "volume type" of the volume management information 34, which corresponds to the copy destination volume. In a case where it is determined that the copy destination volume is not a virtual volume, that is, in which the copy destination volume is a physical volume (No in S403), the process is finished.

Meanwhile, in a case where it is determined that the copy destination volume is a virtual volume (Yes in S403), the allocation control section 26 acquires the allocation information 35 that was created in S108 (S404). Further, the process transitions to S406.

In S401, in a case where it is determined that the received instruction was not a backup instruction, that is, was a restoration instruction (No in S401), the allocation control section 26 specifies and acquires the allocation information 35 that was associated with the restoration source volume (S405). The specification method of the allocation information 35 that was associated with the restoration source volume is the same as that of S304.

Next, the allocation control section 26 initiates confirmation of the physical allocation state from the beginning for the allocation information 35 that was acquired in either S404 or S405 (S406).

Next, the allocation control section 26 determines whether or not physical regions have been allocated (unallocated) to the unit storage regions that correspond to bits by confirming whether or not the value of each bit is "1" for each bit of the allocation information 35 (S407). In a case where it is determined that physical regions have been allocated to the unit storage regions that correspond to the bits (No in S407), the process transitions to S410.

Meanwhile, in a case where it is determined that physical regions have not been allocated to the unit storage regions that correspond to the bits (Yes in S407), the allocation control section 26 determines whether or not physical regions have been allocated to regions of the copy destination volume that corresponds to the unallocated regions (S408). In a case where it is determined that physical regions have been allocated to the regions of the corresponding copy destination volume (No in S408), the process transitions to S410.

Meanwhile, in a case where it is determined that physical regions have been allocated to the regions of the corresponding copy destination volume (Yes in S408), the allocation control section 26 releases the physical regions of the corresponding copy destination volume (S409). In this manner, as a result of releasing the regions of the copy destination volume that correspond to unallocated regions in the copy source volume, the allocation status of the copy source volume and the copy destination volume are set to be the same state at the time of completion of a copy session. In addition, prior to effective copying, the allocation change of the backup destination volume is performed efficiently by changing the allocation state of the backup destination using the allocation state of the backup source.

Next, the allocation control section 26 determines whether or not the determination of S407 is completed for all of the bits of the allocation information 35 (S410). In a case where it is determined that determination has not been completed for any one of the bits of the allocation information 35 (No in S410), the allocation control section 26 causes the process to transition to S407 again, and performs determination for the bits on which determination has not been completed.

Meanwhile, in a case where it is determined that determination of the allocation has been completed for all of the bits of the allocation information 35 (Yes in S410), the process is finished.

Figure 24:
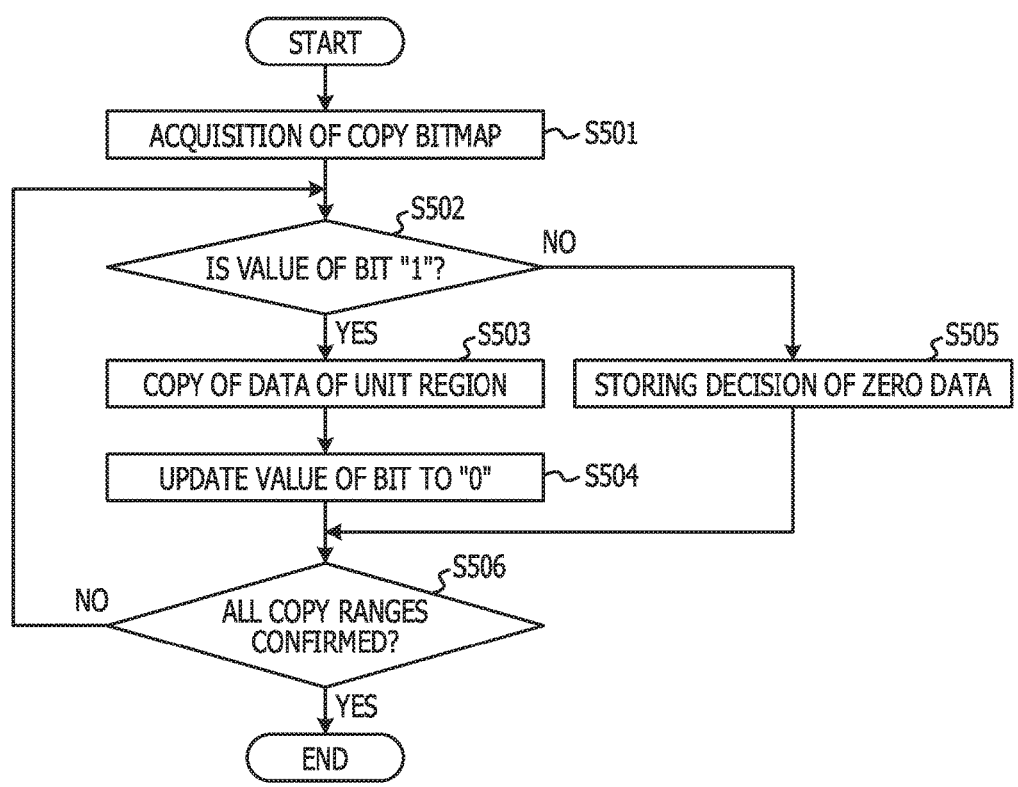
FIG. 24 is an example of a flowchart in which the details of a copy process are illustrated.

Next, the details of the copy process that is executed after the copy session is activated in S111 will be described. FIG. 24 is an example of a flowchart in which the details of a copy process are illustrated.

In FIG. 24, firstly, the reproduction section 27 acquires the copy bitmap 32 of the corresponding session (S501).

Next, the reproduction section 27 determines whether or not the value of the bits is "1" for each bit of the copy bitmap 32 (S502). In a case where it is determined that the value of the bits is "1" (Yes in S502), the reproduction section 27 copies the data of the unit region C that corresponds to the determined bit, to a corresponding region of the copy destination volume (S503).

Next, the reproduction section 27 changes the value of bits of the copy bitmap 32 that correspond to the unit regions C that were copied in S503 from "1" to "0". Further, the process transitions to S506.

Meanwhile, in a case where it is determined that the value of the bits is "0" (No in S502), the zero data storing section 28 performs a determination process of whether or not zero data is stored in the corresponding regions of the copy destination volume (S505). The details of the storing determination process of zero data will be described later with reference to FIG. 25.

Next, the reproduction section 27 determines whether or not the determination of S502 has been performed for all of the bits of the copy bitmap 32 (S506). In a case where it is determined that determination has not been completed for any one of the bits of the copy bitmap 32 (No in S506), the reproduction section 27 causes the process to transition to S502 again, and performs determination for the bits on which determination has not been completed.

Meanwhile, in a case where it is determined that determination of the value has been completed for all of the bits of the copy bitmap 32 (Yes in S506), the process is finished.

Figure 25:
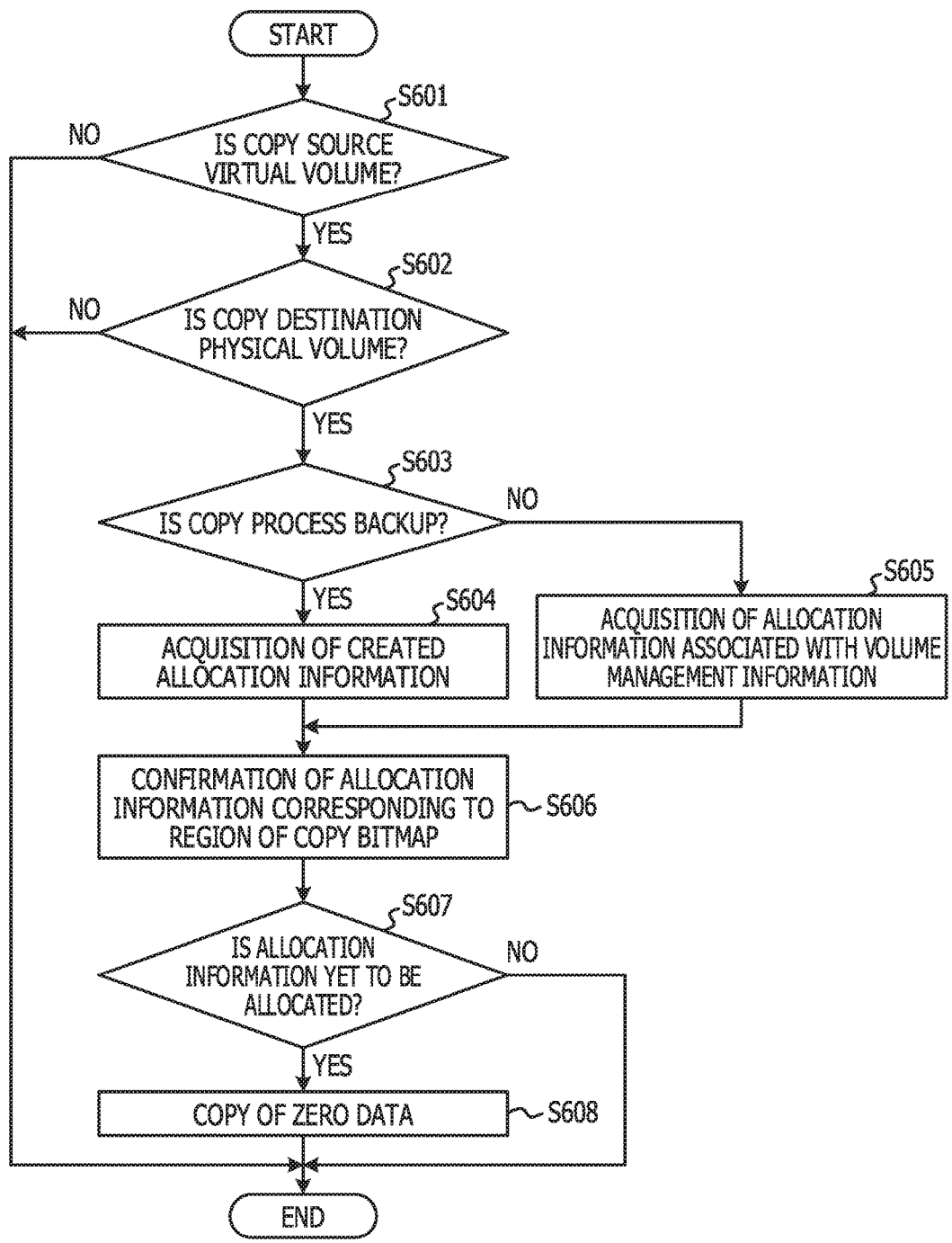
FIG. 25 is an example of a flowchart in which the details of a storing determination process of zero data are illustrated.

Next, the details of the storing determination process of zero data that is executed in S505 will be described. FIG. 25 is an example of a flowchart in which the details of a storing determination process of zero data are illustrated.

In FIG. 25, firstly, the zero data storing section 28 determines whether or not the copy source volume is a virtual volume (S601). For example, the zero data storing section 28 determines whether or not the copy source volume is a virtual volume by referring to the "volume type" of the volume management information 34, which corresponds to the copy source volume. In a case where it is determined that the copy source volume is not a virtual volume, that is, in which the copy source volume is a physical volume (No in S601), the process is finished.

Meanwhile, in a case where it is determined that the copy source volume is a virtual volume (Yes in S601), the zero data storing section 28 determines whether or not the copy destination volume is a physical volume (S602). For example, the zero data storing section 28 determines whether or not the copy destination volume is a physical volume by referring to the "volume type" of the volume management information 34, which corresponds to the copy destination volume. In a case where it is determined that the copy destination volume is not a physical volume, that is, in which the copy destination volume is a virtual volume (No in S602), the process is finished.

Meanwhile, in a case where it is determined that the copy destination volume is a physical volume (Yes in S602), the zero data storing section 28 determines whether or not the corresponding copy session is a backup (S603). For example, the zero data storing section 28 determines whether or not the copy session is a backup by confirming the "mode" of the session management information 31. In a case where it is determined that the corresponding copy session is a session in a backup (Yes in S603), the zero data storing section 28 acquires the allocation information 35 that was created in S108 (S604). Further, the process transitions to S606.

Meanwhile, in a case where it is determined that the corresponding copy session is not a session in a backup, that is, is a session in a restoration, the zero data storing section 28 specifies and acquires the allocation information 35 that was associated with the restoration source volume (S605). The specification method of the allocation information 35 that was associated with the restoration source volume is the same as that of S304.

Next, the zero data storing section 28 checks the physical allocation state of the unit regions C (hereinafter, referred to as target unit regions C) that correspond to the bits that were determined in S502 based on the allocation information 35 that was acquired in S604 or S605 (S606).

Further, the zero data storing section 28 determines whether or not the target unit regions C have had physical regions allocated (unallocated) thereto (S607). For example, the zero data storing section 28 determines whether or not the bits of the unit regions A that include the target unit regions C are "0" in the allocation information 35. In a case where it is determined that physical regions have been allocated to the target unit regions C (No in S607), the process is finished. In a case where it is determined that physical regions have not been allocated to the target unit regions C (Yes in S607), the zero data storing section 28 stores zero data in regions of the copy destination that correspond to the target unit regions (S608). In this manner, since it is determined whether or not zero data is stored based on the allocation information 35, a circumstance in which already copied data is overwritten with zero data is suppressed.

In the manner mentioned above, by storing zero data in regions of the copy destination physical volume that correspond to unallocated regions in the copy source virtual volume, unnecessary data is removed from the copy destination volume. Since unnecessary data is removed from the copy destination physical volume, for example, it is possible to use the copy destination volume as the work volume without change by merely switching the copy destination volume. Further, the process is finished.

Additionally, the process that stores zero data in regions of the copy destination physical volume that correspond to unallocated regions in the copy source virtual volume may be performed prior to the activation of the copy session (either before or after S109 or S110).

Figure 26:
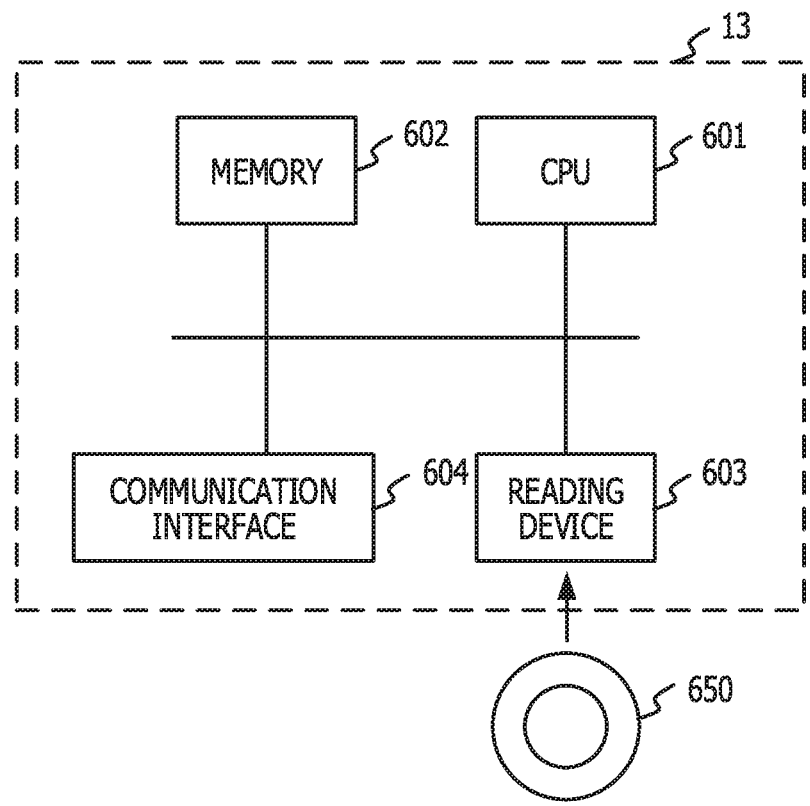
FIG. 26 illustrates an example of a hardware configuration of a storage control device according to an embodiment.

Next, a hardware configuration of the storage control device 13 will be described. FIG. 26 illustrates an example of a hardware configuration of the storage control device 13 according to the embodiment.

In FIG. 26, the storage control device 13 includes a central processing unit (CPU) 601, memory 602, a reading device 603, and a communication interface 604. The CPU 601, the memory 602, the reading device 603 and the communication interface 604 are coupled via a bus or the like.

The CPU 601 executes a program in which the sequence of the above-mentioned flowchart is described, using the memory 602. As a result of executing this program, the CPU 601 provides a portion of or all of the functions of the reception section 22, the session control section 23, the creation section 24, the determination section 25, the allocation control section 26, the reproduction section 27 and the zero data storing section 28. The program that the CPU 601 executes may be a storage control program.

The memory 602 is, for example, semiconductor memory, and is configured to include a random access memory (RAM) region and a read only memory (ROM) region. The memory 602 provides a portion of or all of the functions of the storage section 21. Additionally, information of a portion of or all of the storage section 21 may be stored in the storage device 14.

The reading device 603 accesses a removable storage medium 650 in accordance with the instructions of the CPU 601. The removable storage medium 650 is, for example, realized by a semiconductor device (USB memory or the like), a medium in which information is input and output as a result of magnetic interaction (a magnetic disk or the like), a medium in which information is input and output as a result of optical interaction (a CD-ROM, a DVD or the like), or the like. Additionally, the reading device 603 does not have to be included in the storage control device 13.

The communication interface 604 is coupled to the host apparatus 11, and performs communication control with the host apparatus 11. In addition, the communication interface 604 is coupled to the storage device 14, and performs communication control with the storage device 14. The communication interface 604 that is coupled to the host apparatus 11 is, for example, a channel adapter (CA). The communication interface 604 that is coupled to the storage device 14 is, for example, fiber channel (FC).

Furthermore, a portion of the storage control device 13 of the embodiment may be realized by software. Alternatively, the storage control device 13 of the embodiment may be realized through a combination of software and hardware.

The storage control device 13 is, for example, a centralized module (CM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device configured to control at least one storage device to execute a backup process from a backup source volume which is formed by using the at least one storage device to a backup destination volume which is formed by using the at least one storage device, the backup source volume being a virtual volume and including a plurality of regions, each of the plurality of regions of the backup source volume being flexibly and individually changeable between an allocated state indicating an allocation to the at least one storage device and a non-allocated state indicating a non-allocation to any of the at least one storage device, the storage control device comprising:
a memory; and
a processor coupled to the memory and configured to
set the backup destination volume in the at least one storage device which stores first data, the backup destination volume being a virtual volume, or a physical volume, and including a plurality of regions corresponding to the plurality of regions of the backup source volume respectively, each of the plurality of regions of the backup destination volume being flexibly and individually changeable between the allocated state and the non-allocated state,
store, in the memory, allocation information for the backup process to the backup destination volume to indicate that a first region included in the plurality of regions of the backup source volume is in the allocated state and is allocated to the at least one storage device and indicate that a second region included in the plurality of regions of the backup source volume is in the non-allocated state and is not allocated to any of the at least one storage device, the first region and the second region corresponding to a third region and a fourth region included in the plurality of regions of the backup destination volume respectively,
determine whether the backup destination volume is the virtual volume or the physical volume,
when determined that the backup destination volume is the virtual volume, based on the allocation information, set the fourth region in the non-allocated state in which the fourth region is not allocated to any of the at least one storage device, and copy second data stored in the first region to the third region,
when determined that the backup destination volume is the physical volume, based on the allocation information, store first dummy data in the fourth region, and copy second data stored in the first region to the third region,
receive a restoration instruction which instructs to execute a restore process from the backup destination volume to a restoration destination volume which is formed by using the at least one storage device, the restoration destination volume including a plurality of regions, the third region and the fourth region of the backup destination volume corresponding to a fifth region and a sixth region included in the plurality of regions of the restoration destination volume respectively, and the restoration destination volume being the virtual volume,
acquire, from the memory, the allocation information for the backup process to the backup destination volume,
specify, based on the acquired allocation information, restoration target data stored in the third region,
based on the acquired allocation information, set the sixth region in the non-allocated state in which the sixth region is not allocated to any of the at least one storage device, and allocate the fifth region to the at least one storage device, and
restore the specified restoration target data to the fifth region in the restoration destination volume.

2. The storage control device according to claim 1, wherein the processor is further configured to
when the backup destination volume is the virtual volume, in setting the fourth region in the non-allocated state, based on the allocation information, allocate the third region to the at least one storage device while not allocate the fourth region to any of the at least one storage device.

3. The storage control device according to claim 1, wherein the backup destination is the physical volume, and the processor is further configured to:
based on the allocation information, copy the restoration target stored in the third region to the fifth region while not copying the first dummy data stored in the fourth region to the sixth region.

4. A method of controlling at least one storage device to execute a backup process from a backup source volume which is formed by using the at least one storage device to a backup destination volume which is formed by using the at least one storage device, the backup source volume being a virtual volume and including a plurality of regions, each of the plurality of regions of the backup source volume being flexibly and respectively changeable between an allocated state indicating an allocation to the at least one storage device and a non-allocated state indicating a non-allocation to any of the at least storage device, the method comprising:
setting the backup destination volume in the at least one storage device which stores first data, the backup destination volume being a virtual volume, or a physical volume, and including a plurality of regions corresponding to the plurality of regions of the backup source volume respectively, each of the plurality of regions of the backup destination volume being flexibly and respectively changeable between the allocated state and the non-allocated state;
storing, in a memory, allocation information for the backup process to the backup destination volume to indicate that a first region included in the plurality of regions of the backup source volume is in the allocated state and is allocated to the at least one storage device and indicate that a second region included in the plurality of regions of the backup source volume is in the non-allocated state and is not allocated to any of the at least one storage device, the first region and the second region corresponding to a third region and a fourth region included in the plurality of regions of the backup destination volume respectively;
determining whether the backup destination volume is the virtual volume or the physical volume;
when determined that the backup destination volume is the virtual volume, based on the allocation information, setting the fourth region in the non-allocated state in which the fourth region is not allocated to any of the at least one storage device, and copying second data stored in the first region to the third region;
when determined that the backup destination volume is the physical volume, based on the allocation information, storing first dummy data in the fourth region, and copying second data stored in the first region to the third region;

receiving a restoration instruction which instructs to execute a restore process from the backup destination volume to a restoration destination volume which is formed by using the at least one storage device, the restoration destination volume including a plurality of regions, the third region and the fourth region of the backup destination volume corresponding to a fifth region and a sixth region included in the plurality of regions of the restoration destination volume respectively, and the restoration destination volume being the virtual volume;

acquire, from the memory, the allocation information for the backup process to the backup destination volume, specifying, based on the acquired allocation information, restoration target data stored in the third region;

based on the allocation information, setting the sixth region in the non-allocated state in which the sixth region is not allocated to any of the at least one storage device, and allocating the fifth region to the at least one storage device; and restoring the specified restoration target data to the fifth region in the restoration destination volume.

5. The method according to claim 4, wherein
when the backup destination volume is the virtual volume, in setting the forth region in the non-allocated state, based on the allocation information, the third region is allocated to the at least one storage device while the fourth region is not allocated to any of the at least one storage device.

6. The method according to claim 4, wherein
the backup destination is the physical volume, and
the method further comprises:
based on the allocation information, copying the restoration target stored in the third region to the fifth region while not copying the first dummy data stored in the fourth region to the sixth region.

7. A storage system comprising:
at least one storage device; and
a control device including a memory and a processor coupled to the memory, the control device configured to,
control the at least one storage device to execute a backup process from a backup source volume which is formed by using the at least one storage device to a backup destination volume which is formed by using the at least one storage device, the backup source volume being a virtual volume and including a plurality of regions, each of the plurality of regions of the backup source volume being flexibly and respectively changeable between an allocated state indicating an allocation to the at least one storage device and a non-allocated state indicating a non-allocation to any the at least one storage device set the backup destination volume in the at least one storage device which stores first data, the backup destination volume being a virtual volume, or a physical volume, and including a plurality of regions corresponding to the plurality of regions of the backup source volume respectively, each of the plurality of regions of the backup destination volume being flexibly and individually changeable between the allocated state and the non-allocated state, store, in the memory, allocation information for the backup process to the backup destination volume to indicate that a first region included in the plurality of regions of the backup source volume is in the allocated state and is allocated to the at least one storage device and indicate that a second region included in the plurality of regions of the backup source volume is in the non-allocated state and is not allocated to any of the at least one storage device, the first region and the second region corresponding to a third region and a fourth region included in the plurality of regions of the backup destination volume respectively, determine whether the backup destination volume is the virtual volume or the physical volume, when determined that the backup destination volume is the virtual volume, based on the allocation information, set the fourth region in the non-allocated state in which the fourth region is not allocated to any of the at least one storage device, and copy second data stored in the first region to the third region, when determined that the backup destination volume is the physical volume, based on the allocation information, store first dummy data in the fourth region, and copy second data stored in the first region to the third region, receive a restoration instruction which instructs to execute a restore process from the backup destination volume to a restoration destination volume which is formed by using the at least one storage device, the restoration destination volume including a plurality of regions, the third region and the fourth region of the backup destination volume corresponding to a fifth region and a sixth region included in the plurality of regions of the restoration destination volume respectively, and the restoration destination volume being the virtual volume, acquire, from the memory, the allocation information for the backup process to the backup destination volume, specify, based on the acquired allocation information, restoration target data stored in the third region, based on the allocation information, set the sixth region in the non-allocated state in which the sixth region is not allocated to any of the at least one storage device, and allocate the fifth region to the at least one storage device, and restore the specified restoration target data to the fifth region in the restoration destination volume.

8. The storage system according to claim 7, wherein the processor is configured to
when the backup destination volume is the virtual volume, in setting the fourth region in the non-allocated state, based on the allocation information, allocate the third region to the at least one storage device while not allocate the fourth region to any of the at least one storage device.

9. The storage system according to claim 7, wherein the backup destination is the physical volume, and
the processor is further configured to: based on the allocation information, copy the restoration target stored in the third region to the fifth region while not copying the first dummy data stored in the fourth region to the sixth region.

\* \* \* \* \*